(12) United States Patent
Donsbach et al.

(10) Patent No.: US 11,710,496 B2
(45) Date of Patent: Jul. 25, 2023

(54) ADAPTIVE DIARIZATION MODEL AND USER INTERFACE

(71) Applicant: Google LLC, Mountain View, CA (US)

(72) Inventors: Aaron Donsbach, Seattle, WA (US); Dirk Padfield, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/596,861

(22) PCT Filed: Jul. 1, 2019

(86) PCT No.: PCT/US2019/040111
§ 371 (c)(1),
(2) Date: Dec. 20, 2021

(87) PCT Pub. No.: WO2021/002838
PCT Pub. Date: Jul. 1, 2021

(65) Prior Publication Data
US 2022/0310109 A1    Sep. 29, 2022

(51) Int. Cl.
*G10L 15/26* (2006.01)
*G10L 15/08* (2006.01)
(Continued)

(52) U.S. Cl.
CPC ........ *G10L 21/0308* (2013.01); *G06F 3/0481* (2013.01); *G06F 3/167* (2013.01);
(Continued)

(58) Field of Classification Search
CPC ....... G10L 15/04; G10L 17/00; G10L 15/063; G10L 15/08; G06F 3/0481; G06F 18/23
See application file for complete search history.

(56) References Cited

U.S. PATENT DOCUMENTS

| 6,424,946 B1 * | 7/2002 | Tritschler ............ G06F 18/2321 707/E17.058 |
| 8,543,402 B1 * | 9/2013 | Ma .......................... G10L 17/08 704/256.4 |

(Continued)

FOREIGN PATENT DOCUMENTS

| JP | 2011248002 | 12/2011 |
| JP | 2012093641 | 5/2012 |

(Continued)

OTHER PUBLICATIONS

Chakraborty et al., "An improved approach to open set text-independent speaker identification (OSTI-SI)", 2017,. In2017 Third International Conference on Research in Computational Intelligence and Communication Networks (ICRCICN) Nov. 3, 2017 (pp. 51-56). IEEE.*

(Continued)

*Primary Examiner* — Olujimi A Adesanya
(74) *Attorney, Agent, or Firm* — McDonnell Boehnen Hulbert & Berghoff LLP

(57) ABSTRACT

A computing device receives a first audio waveform representing a first utterance and a second utterance. The computing device receives identity data indicating that the first utterance corresponds to a first speaker and the second utterance corresponds to a second speaker. The computing device determines, based on the first utterance, the second utterance, and the identity data, a diarization model configured to distinguish between utterances by the first speaker and utterances by the second speaker. The computing device receives, exclusively of receiving further identity data indicating a source speaker of a third utterance, a second audio waveform representing the third utterance. The computing device determines, by way of the diarization model and independently of the further identity data of the first type, the source speaker of the third utterance. The computing device (Continued)

updates the diarization model based on the third utterance and the determined source speaker.

20 Claims, 13 Drawing Sheets

(51) Int. Cl.
*G10L 21/0308* (2013.01)
*G06F 3/0481* (2022.01)
*G06F 3/16* (2006.01)
*G10L 17/06* (2013.01)
*G10L 17/24* (2013.01)
*G10L 21/028* (2013.01)

(52) U.S. Cl.
CPC .............. *G10L 17/06* (2013.01); *G10L 17/24* (2013.01); *G10L 21/028* (2013.01)

(56) References Cited

U.S. PATENT DOCUMENTS

| | | | |
|---|---|---|---|
| 9,300,790 B2 | 3/2016 | Gainsboro et al. | |
| 9,514,753 B2* | 12/2016 | Sharifi | G10L 17/18 |
| 11,152,013 B2* | 10/2021 | Song | G06N 3/049 |
| 2008/0077387 A1* | 3/2008 | Ariu | G10L 15/22 |
| | | | 704/E15.04 |
| 2011/0282661 A1* | 11/2011 | Dobry | G10L 17/02 |
| | | | 704/E15.001 |
| 2015/0134322 A1 | 5/2015 | Cuthbert et al. | |
| 2015/0227510 A1* | 8/2015 | Shin | G10L 15/04 |
| | | | 704/2 |
| 2017/0286407 A1 | 10/2017 | Chochowski et al. | |
| 2017/0359666 A1* | 12/2017 | Lyren | G10L 15/04 |
| 2018/0158463 A1* | 6/2018 | Ge | G10L 17/04 |
| 2018/0197548 A1* | 7/2018 | Palakodety | G10L 17/06 |
| 2020/0111495 A1* | 4/2020 | Ziv | G10L 17/00 |
| 2020/0152207 A1* | 5/2020 | Wang | G10L 17/04 |
| 2020/0194006 A1* | 6/2020 | Grancharov | G06F 17/18 |
| 2020/0311354 A1* | 10/2020 | Furukawa | G06F 3/167 |
| 2020/0342857 A1* | 10/2020 | Moreno | G10L 15/30 |
| 2020/0349950 A1* | 11/2020 | Yoshioka | G10L 15/083 |
| 2021/0280169 A1* | 9/2021 | Suzuki | G10L 15/22 |
| 2022/0115020 A1* | 4/2022 | Bradley | G06F 3/0334 |
| 2022/0122615 A1* | 4/2022 | Chen | G10L 17/02 |

FOREIGN PATENT DOCUMENTS

| | | | | |
|---|---|---|---|---|
| JP | 2017182397 | 10/2017 | | |
| JP | 2017530387 | 10/2017 | | |
| WO | WO-2013134106 A2 * | 9/2013 | .......... | G06F 17/218 |
| WO | 2018/009969 | 1/2018 | | |
| WO | WO-2018009969 A1 * | 1/2018 | ............. | G10L 17/02 |

OTHER PUBLICATIONS

Alwahed et al., "A Forensic Speaker Recognition System for the Arabic language", Mar. 1, 2019, Journal of Advanced Research in Dynamical and Control Systems 11(4):7, pp. 1-13.*

Lupu et al., "Speaker identification approach based on time domain extracted features", 2010, InProceedings ELMAR-2010 Sep. 15, 2010 (pp. 355-358). IEEE.*

Lee et al, "Automated Transcript Generation for Video Conferences." 2017, Standford university, (2017), pp. 1-6.*

Japanese Patent Office, Office Action dated Jan. 24, 2023 issued in connection with Japanese Patent Application No. 2021-577103, 7 pages.

International Searching Authority, International Search Report and Written Opinion dated Feb. 120, 2020, issued in connection with International Patent Application No. PCT/US2019/040111 filed on Jul. 1, 2019, 9 pages.

* cited by examiner

ADAPTIVE DIARIZATION MODEL AND USER INTERFACE

CROSS-REFERENCE TO RELATED APPLICATIONS

The present application is a National Stage Application under 35 U.S.C. § 371 and claims priority to International Patent Application No. PCT/US2019/040111, filed Jul. 1, 2019, and titled "Adaptive Diarization Model and User Interface," which is incorporated herein by reference in its entirety.

BACKGROUND

Diarization, or speaker diarization, involves partitioning audio data into one or more sections according to speaker identity. Diarization thus involves answering the question "who spoke when?" Diarization processes or algorithms may thus be used in the context of speech transcription, speech translation, or any other context in which speaker identity is necessary or useful.

SUMMARY

A diarization model may be trained to distinguish between two or more speakers. The training may be based on a supervised data set that includes a waveform and corresponding hint/identity data that indicates which speaker spoke when within the waveform. Once trained, the diarization model may be used to determine the source speaker of an utterance without relying on further hint/identity data. As the trained model makes such determinations, the determinations may be fed back into the model, allowing the model to grow and adapt over time, thus improving its accuracy.

When employed in the context of a translation application, for example, the supervised data may be generated based on users taking turns speaking at predetermined times. For example, a speaker may speak after pressing a button, which may optionally correspond to a particular language, thus generating the hint/identity data for the accompanying waveform. In another example, each speaker may be provided with a corresponding calibration time period during which they are asked to say a few phrases. In a further example, image data may constitute the hint/identity data in that it may indicate which speaker is actively speaking by representing facial movements of the speaker.

Accordingly, in a first example embodiment, a method may include receiving, by a computing device, a first audio waveform captured during an initial time window and representing a first utterance and a second utterance. The method may also include receiving, by the computing device, identity data of a first type indicating that (i) the first utterance corresponds to a first speaker and (ii) the second utterance corresponds to a second speaker. The method may additionally include determining, by the computing device and based on the first utterance, the second utterance, and the identity data of the first type, a diarization model configured to distinguish between utterances by the first speaker and utterances by the second speaker. The method may further include receiving, by the computing device and exclusively of receiving further identity data of the first type indicating a source speaker of a third utterance, a second audio waveform captured during a subsequent time window and representing the third utterance. The method may yet additionally include determining, by the computing device, by way of the diarization model, and independently of the further identity data of the first type, the source speaker of the third utterance, where the source speaker is determined to be the first speaker or the second speaker. The method may yet further include updating, by the computing device, the diarization model based on the third utterance and the determined source speaker.

In a second example embodiment, a system may include a microphone and a processor configured to perform operations. The operations may include receiving, from the microphone, a first audio waveform captured during an initial time window and representing a first utterance and a second utterance. The operations may also include receiving identity data of a first type indicating that (i) the first utterance corresponds to a first speaker and (ii) the second utterance corresponds to a second speaker. The operations may additionally include determining, based on the first utterance, the second utterance, and the identity data of the first type, a diarization model configured to distinguish between utterances by the first speaker and utterances by the second speaker. The operations may further include receiving, from the microphone and exclusively of receiving further identity data of the first type indicating a source speaker of a third utterance, a second audio waveform captured during a subsequent time window and representing the third utterance. The operations may yet additionally include determining, by way of the diarization model and independently of the further identity data of the first type, the source speaker of the third utterance, where the source speaker is determined to be the first speaker or the second speaker. The operations may yet further include updating the diarization model based on the third utterance and the determined source speaker.

A third example embodiment may include a non-transitory computer-readable storage medium having stored thereon instructions that, when executed by a computing device, cause the computing device to perform operations. The operations may include receiving a first audio waveform captured during an initial time window and representing a first utterance and a second utterance. The operations may also include receiving identity data of a first type indicating that (i) the first utterance corresponds to a first speaker and (ii) the second utterance corresponds to a second speaker. The operations may additionally include determining, based on the first utterance, the second utterance, and the identity data of the first type, a diarization model configured to distinguish between utterances by the first speaker and utterances by the second speaker. The operations may further include receiving a second audio waveform captured during a subsequent time window and representing a third utterance, where the second audio waveform is received exclusively of receiving further identity data of the first type indicating a source speaker of a third utterance. The operations may yet additionally include determining, by way of the diarization model and independently of the further identity data of the first type, the source speaker of the third utterance, where the source speaker is determined to be the first speaker or the second speaker. The operations may yet further include updating the diarization model based on the third utterance and the determined source speaker.

In a fourth example embodiment, a system is provided that includes means for receiving a first audio waveform captured during an initial time window and representing a first utterance and a second utterance. The system may also include means for receiving identity data of a first type indicating that (i) the first utterance corresponds to a first speaker and (ii) the second utterance corresponds to a second speaker. The system may additionally include means for determining, based on the first utterance, the second utterance, and the identity data of the first type, a diarization model configured to distinguish between utterances by the first speaker and utterances by the second speaker. The system may further include means for receiving, exclusively of receiving further identity data of the first type indicating a source speaker of a third utterance, a second audio waveform captured during a subsequent time window and representing the third utterance. The system may yet additionally include means for determining, by way of the diarization model and independently of the further identity data of the first type, the source speaker of the third utterance, where the source speaker is determined to be the first speaker or the second speaker. The system may yet further include means for updating the diarization model based on the third utterance and the determined source speaker.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
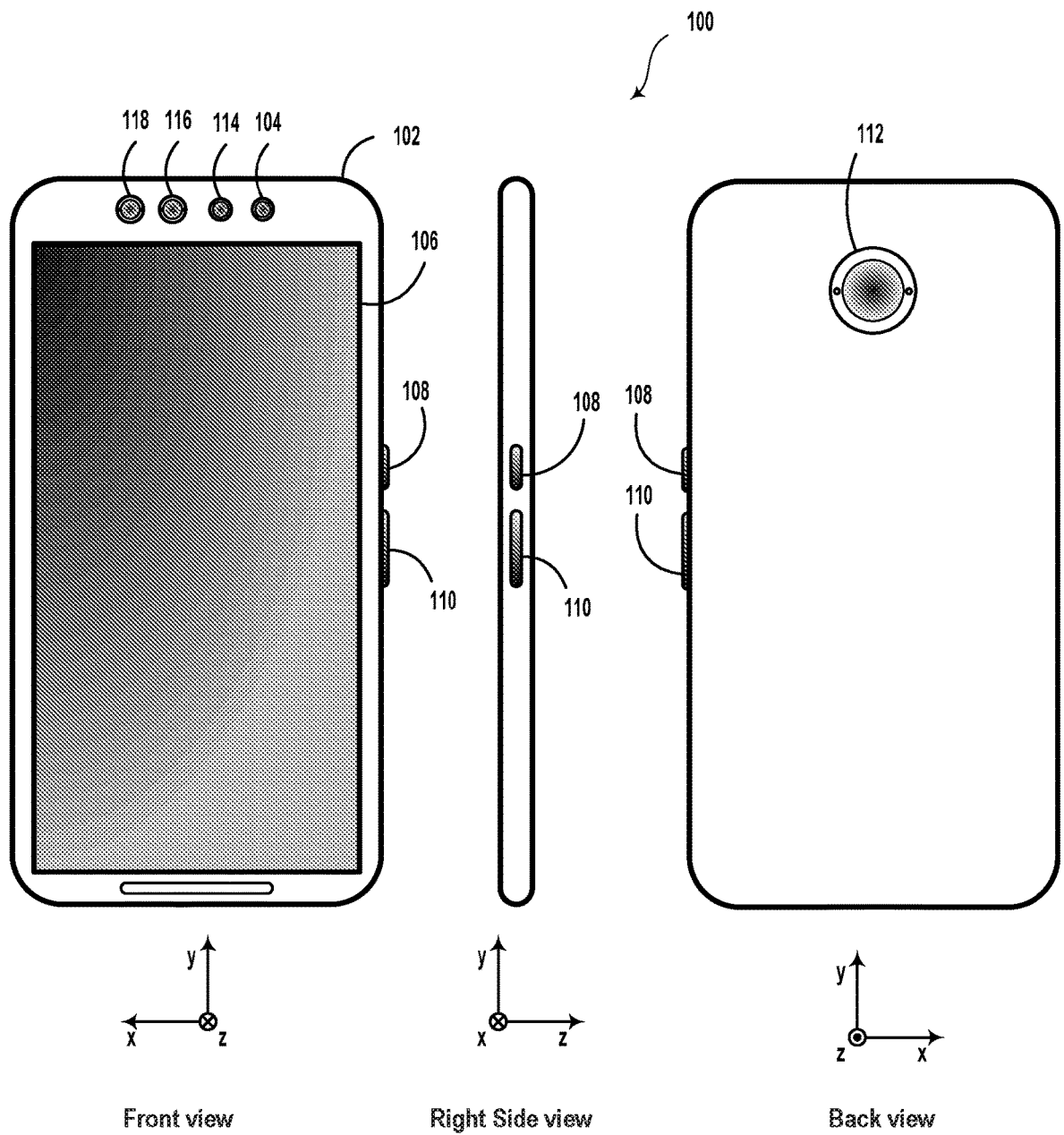
FIG. 1 illustrates a computing system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A diarization model may be used to determine, based on an audio waveform, which one of multiple speakers spoke during a particular period of time within the audio waveform. Thus, an audio waveform that includes therein multiple utterances by different speakers may be partitioned according to the speaker of each utterance. The diarization model may be trained based on a training waveform that is associated with hint/identity data which indicates the speaker associated with each utterance in the training waveform. Once trained, the diarization model may be used to determine the speaker associated with a particular utterance independently of and/or without reliance on any additional identity data. As the diarization model operates to identify the speakers of various utterances, the model may be updated based on these identifications of speakers. That is, the diarization model may grow, adapt, and evolve based on unsupervised predictions that the model makes over time.

Notably, the terms hint data, identity data, and/or identity hint data are used herein to indicate the assignment of a label (e.g., speaker #1, speaker A, or some other arbitrary label) to a given voice signal. This label may be maintained over time as that same voice is encountered. This label might not include or be associated with other personally identifiable information about a person (e.g., name, address, etc.), such that the label is effectively anonymous. Privacy and anonymity may be further supported by (i) generating a new diarization model each time two users have a conversation (and discarding the model once the conversation ends), (ii) generating, executing, and storing the diarization model locally on one computing device (e.g., the computing device executing a translation application), rather than, for example, on a cloud-based platform, and/or (iii) not sharing aspects of diarization model that are specific to a particular user might with other computing devices, among other possibilities.

The diarization model may be used as part of a translation application or a transcription application, among other possible applications. In the context of the translation application, the translation application may provide a graphical user interface (UI) that includes at least two buttons. A first button may correspond to a first speaker and optionally to a first language, while the second button may correspond to a second speaker and optionally to a second language. When the first speaker elects to have his or her speech translated, the first speaker may press the first button and begin speaking. The translation application may capture the utterances generated by the first speaker and, when no sound above a threshold amplitude is detected for at least a predetermined period of time (e.g., 2.5 seconds), the translation application may cease listening for more utterances. The translation application may generate a textual representation of the utterances, translate the text into the second language, and display this text to the second speaker.

At this point, the second speaker may press the second button and repeat a similar procedure to respond to the first speaker. Such back and forth may continue indefinitely until the conversation ends. Notably, however, relying on such explicit speaker indications necessitates repeated inputs to the device(s) being used (e.g. touch inputs to the first and second buttons) specifically for the purpose of identifying each speaker to the device(s). The device(s) must detect and process these received inputs. Relying on explicit speaker indications may also be cumbersome and error prone.

For example, one of the speakers may hit the wrong button, thus causing the translation application to attempt to translate, for example, English into Spanish while the speaker actually produces utterance in Spanish. In another example, a speaker may start speaking before or too soon after hitting his or her respective button, thus resulting in an initial portion of the utterance not being represented in the captured waveform. In a further example, the translation application may rely on a predetermined silent period to determine that a user has finished speaking. In noisy environments, however, such silence might not be available, resulting in the translation application listening to a particular speaker indefinitely or for too long of a period after this speaker has ceased speaking. In addition to potentially lengthening and/or introducing errors into the process, this may also require hardware elements of the device(s) being used, such as one or more microphones of the device(s), to be deployed for longer. One effect of this may be to increase the amount of power required by the device(s) when implementing the process, thereby shortening battery life of the device(s) and/or otherwise consuming additional on-device power.

Such shortcomings may be ameliorated by employing the diarization model to automatically classify utterances within a waveform among two or more speakers. Notably, the process of pressing a button followed by speaking allows the translation application to generate supervised learning data. Namely, the utterances captured after the first button has been pressed are indicated to correspond to the first speaker, while the utterances captured after the second button is pressed are indicated to correspond to the second speaker. Such supervised learning data may thus be used to train the diarization model. Once trained, the translation application might no longer request explicit speaker indications (i.e., speaker identity data), relying instead on the diarization model to identify the speaker.

The diarization model may operate based on, for example, 250 millisecond portions of the captured waveform. Thus, the translation application may have a maximum latency of, for example, 250 milliseconds in responding to changes in the actively-speaking speaker. Additionally, since explicit speaker indications are no longer requested or needed, any human error may be reduced, minimized, and/or eliminated. For example, the application can listen for utterances by a different speaker without relying on explicit button presses, thus avoid portions of an utterance being cut off while transitioning from speaker to speaker. Further, determining the end of a speaker's string of utterances may no longer depend on a silent period, thus allowing the other speaker to begin speaking without any unnatural pauses. Each of these advantages results in the translation application allowing for a much more natural, unimpeded conversation to take place between two or more speakers. Furthermore, the length of the overall interaction may be reduced, producing corresponding reductions in e.g. screen-on time, microphone-on time, and/or power consumption at the device(s).

As the diarization model operates to automatically identify speakers in utterances independently (e.g., exclusively) of any hint/identity data, these automatic speaker identifications may be fed back into the model, resulting in a model that grows and adapts as it operates. In some implementations, speaker identifications determined with at least a threshold confidence value may be used to update the diarization model, while speaker identifications having a confidence value below the threshold confidence value might not. The model may thus be updated using predictions that are likely to be correct while keeping potentially erroneous predictions out of the model. Additionally or alternatively, the initial training data may be weighted more heavily within the model than data resulting from the automated speaker identifications. Such an approach may allow the model to adapt without any single automated speaker identification being able to significantly change the model, thus reducing the effect of any erroneous speaker identifications.

In the absence of such adaptation, the model might need to be trained on about 5 seconds of speech data for each speaker (e.g., a waveform having utterances lasting a total of at least 10 seconds in a two-speaker scenario). The amount of training data needed may be longer when, for example, the speaker generates utterances that sound very similar, and thus do not express a wide range of the speaker's voice. On the contrary, when the diarization model is allowed to adapt based on its own predictions, 1 second of speech data per speaker may be sufficient to train the model before it is allowed to make automated predictions unaccompanied by hint/identity data. Nevertheless, as the model adapts, it may reach the same or comparable level of speaker identification accuracy as a model that has been trained for longer (e.g., based on 5 or more seconds of speech). Thus, the adaptive model can allow the translation application to phase out requests for explicit speaker identification much faster than a non-adaptive model that remains constant throughout the conversation.

The diarization model may be made up of a waveform embedding model and a vector classification model. The embedding model may define a mathematical transformation between (i) a plurality of samples of a waveform (e.g., 250 milliseconds sampled at a particular rate) and (ii) a vector space. The output of the embedding model may be an embedding vector having values that are indicative of various physical properties or characteristics of a speaker's voice. The embedding model may be trained on a large corpus of utterances labeled with their corresponding speakers such that voices that sound different are pushed apart in vector space and voices that sound similar are grouped close together in vector space. Thus, during a conversation, the embedding model may generate a first cluster of embedding vectors for the first speaker and a second cluster of embedding vectors for the second speaker. Notably, the speakers of the utterances contained in the corpus used in the training of the embedding model may be different from the speakers in the conversation. Thus, the training of the embedding model may be done once, and this trained embedding model can be applied to any new conversation between any group of speakers.

In order to identify a speaker of an unlabeled utterance, the utterance may be processed by the embedding model to generate an embedding vector. This embedding vector may then be compared to the first cluster and the second cluster by way of the vector classification model, which may be a k-nearest neighbors model, a nearest centroid model, a Gaussian Naive Bayes model, or another similar model. A speaker of the utterance may be determined based on a confidence metric or other quantitative measure generated by the vector classification model. The diarization model may be updated by adding classifications generated by the model to either the first or second cluster of embedding vectors.

II. Example Computing Devices

FIG. 1 illustrates an example form factor of computing system 100. Computing system 100 may be, for example, a mobile phone, a tablet computer, or a wearable computing device. However, other embodiments are possible. Computing system 100 may include various elements, such as body 102, display 106, and buttons 108 and 110. Computing system 100 may further include front-facing camera 104, rear-facing camera 112, front-facing infrared camera 114, first infrared pattern projector 116, and second infrared pattern projector 118.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing system 100 may include multiple cameras positioned on various sides of body 102. Front-facing camera 104 and rear-facing camera 112 may each be configured to capture images in the visible light spectrum.

Display 106 could represent a cathode ray tube (CRT) display, a light emitting diode (LED) display, a liquid crystal (LCD) display, a plasma display, an organic light emitting diode (OLED) display, or any other type of display known in the art. In some embodiments, display 106 may display a digital representation of the current image being captured by front-facing camera 104, rear-facing camera 112, and/or infrared camera 114, and/or an image that could be captured or was recently captured by one or more of these cameras. Thus, display 106 may serve as a viewfinder for the cameras. Display 106 may also support touchscreen functions that may be able to adjust the settings and/or configuration of any aspect of computing system 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 and/or infrared camera 114 may be similarly or differently arranged. Additionally, one or more of front-facing camera 104, rear-facing camera 112, or infrared camera 114, may be an array of one or more cameras.

Either or both of front facing camera 104 and rear-facing camera 112 may include or be associated with an illumination component that provides a light field in the visible light spectrum to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

First infrared pattern projector 116 and second infrared pattern projector 118 may each be configured to project a corresponding infrared structured light pattern onto the target object. In one example, first infrared projector 116 may be configured to project a dot pattern and second infrared projector 118 may be configured to project a flood pattern. Thus, first and second infrared projectors 116 and 118 may be used in combination with infrared camera 114 to determine a plurality of depth values corresponding to different physical features of the target object.

Namely, first infrared projector 116 may project a known dot pattern onto the target object, and infrared camera 114 may capture an infrared image of the target object that includes the projected dot pattern. Computing system 100 may then determine a correspondence between a region in the captured infrared image and a particular part of the projected dot pattern. Given a position of first infrared projector 116, a position of infrared camera 114, and the location of the region corresponding to the particular part of the projected dot pattern within the captured infrared image, computing system 100 may then use triangulation to estimate a depth to a surface of the target object.

By repeating this for different regions corresponding to different parts of the projected dot pattern, computing system 100 may estimate the depth of various physical features or portions of the target object. In this way, computing system 100 may be used to generate a three-dimensional (3D) model of the target object. Second infrared projector 118 may be used to illuminate the target object with a flood pattern to compensate for different lighting conditions (e.g., in dark environments). That is, second infrared projector 118 may allow the images captured by infrared camera 114 to represent the target object illuminated with a substantially constant infrared power across different environments and lighting conditions. The flood pattern projected by second infrared projector 118 may provide constant and uniform illumination.

In some embodiments, the projected dot pattern may be a known or an otherwise predetermined pattern that is a unique combination or arrangement of dots. When the dot pattern is predetermined, unique portions of that pattern may be located within captured infrared images and may provide a reference point for triangulation. For example, once a unique portion of a predetermined pattern is identified in a captured infrared image, properties of that unique portion of the predetermined pattern (such as its size and location) can be used as a basis to determine the depth of a surface on which that unique portion is projected.

Computing system 100 may also include an ambient light sensor that may continuously or from time to time determine the ambient brightness of a scene (e.g., in terms of visible and/or infrared light) that cameras 104, 112, and/or 114 can capture. In some implementations, the ambient light sensor can be used to adjust the display brightness of display 106. Additionally, the ambient light sensor may be used to determine an exposure length of one or more of cameras 104, 112, or 114, or to help in this determination.

Computing system 100 could be configured to use display 106 and front-facing camera 104, rear-facing camera 112, and/or front-facing infrared camera 114 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

As noted above, the functions of computing system 100 may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a computer (such as a desktop, notebook, tablet, or handheld computer), personal digital assistant (PDA), a home automation component, a digital video recorder (DVR), a digital television, a remote control, a wearable computing device, a gaming console, a robotic device, or some other type of device equipped with at least some audio capture and/or audio processing capabilities. It should be understood that computing device 200 may represent a physical audio processing system, a particular physical hardware platform on which an audio sensing and processing application operates in software, or other combinations of hardware and software that are configured to carry out audio capture, processing, and/or diarization functions.

Figure 2:
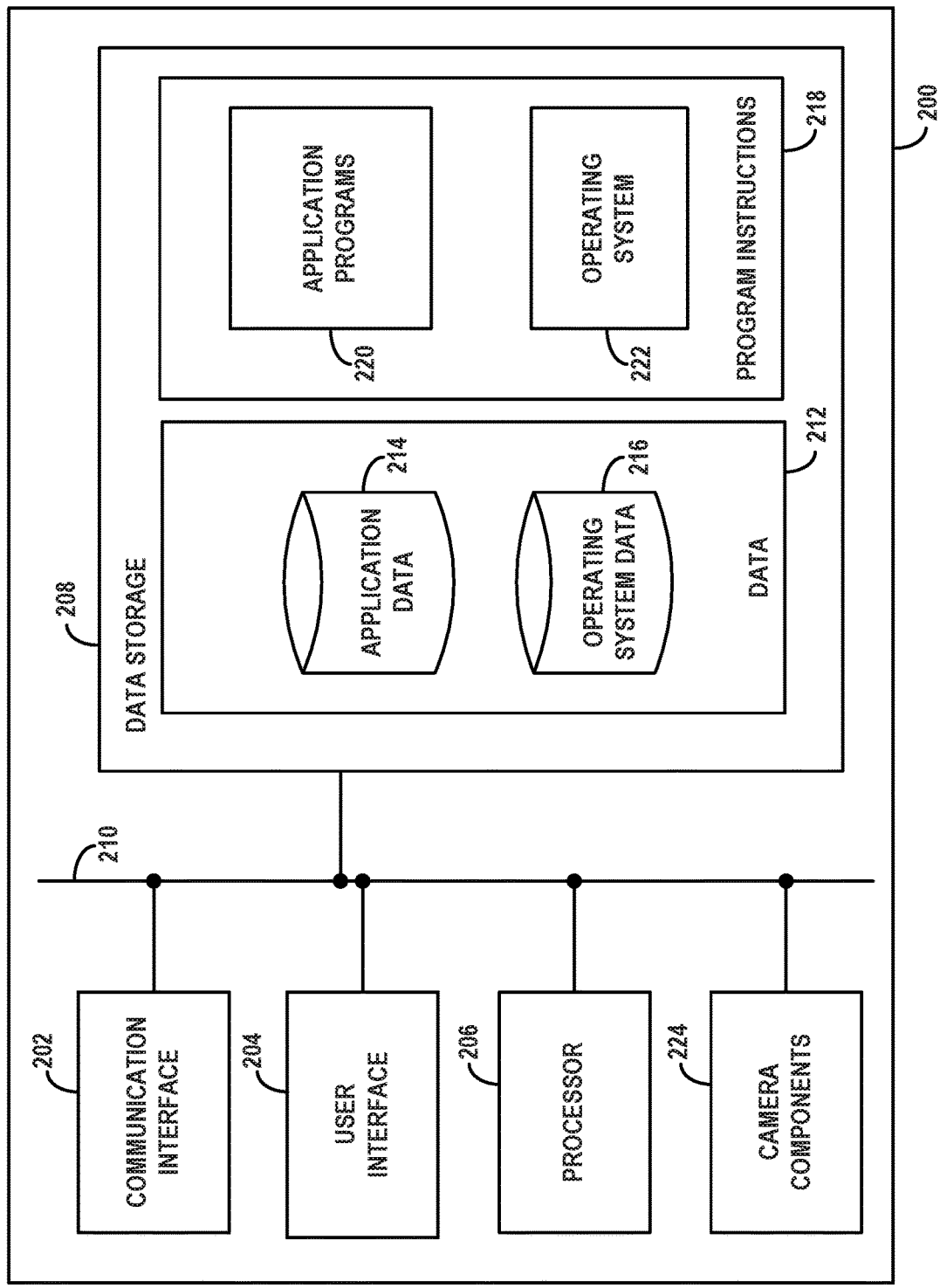
FIG. 2 illustrates a computing device, in accordance with example embodiments.

As shown in FIG. 2, computing device 200 may include communication interface 202, user interface 204, processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some embodiments, user interface 204 may include a display that serves as a viewfinder for still camera and/or video camera functions supported by computing device 200 (e.g., in both the visible and infrared spectrum). Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example User Interfaces

Figure 3A:
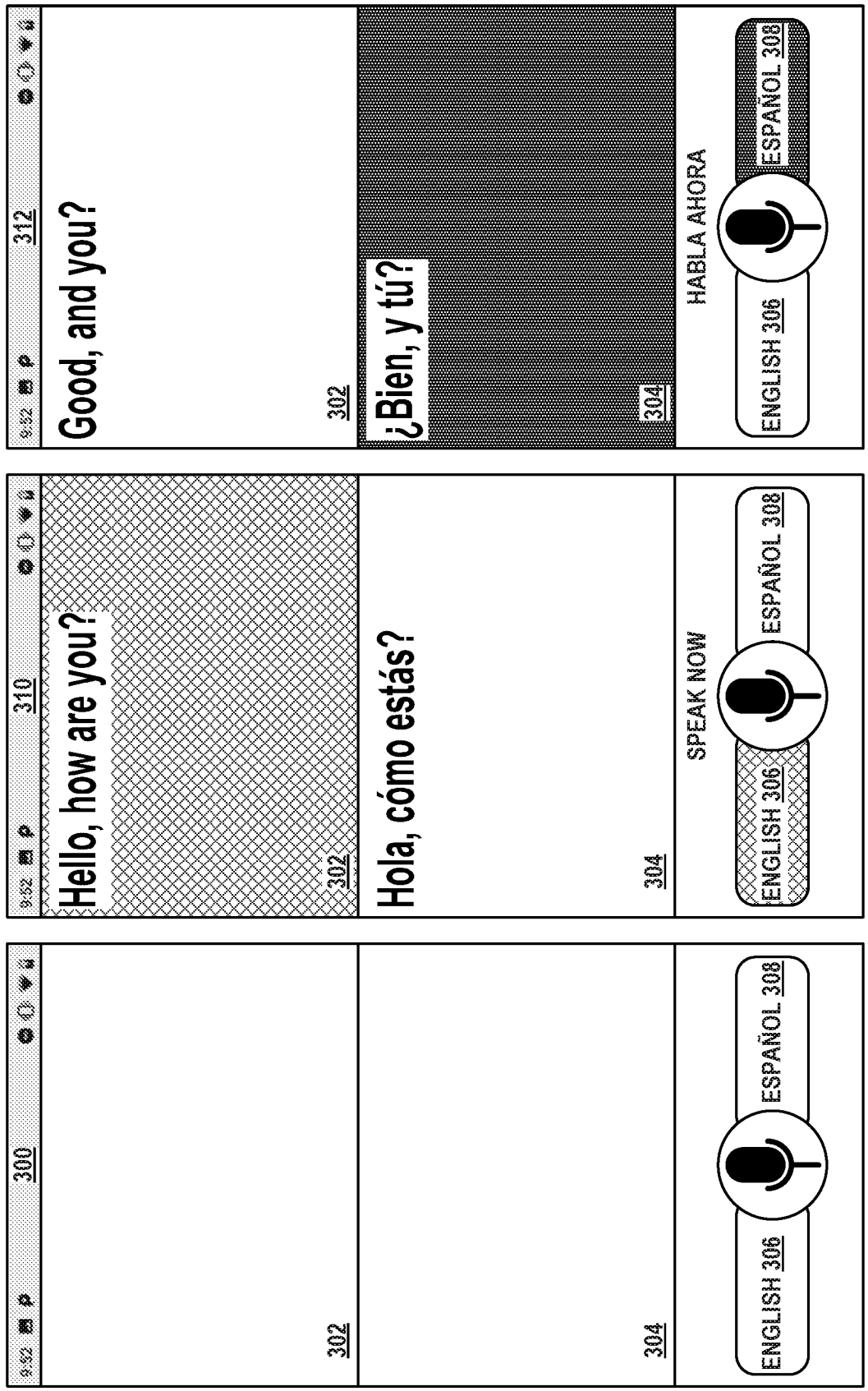
FIGS. 3A, 3B, and 3C illustrate user interfaces, in accordance with example embodiments.
Figure 3B:
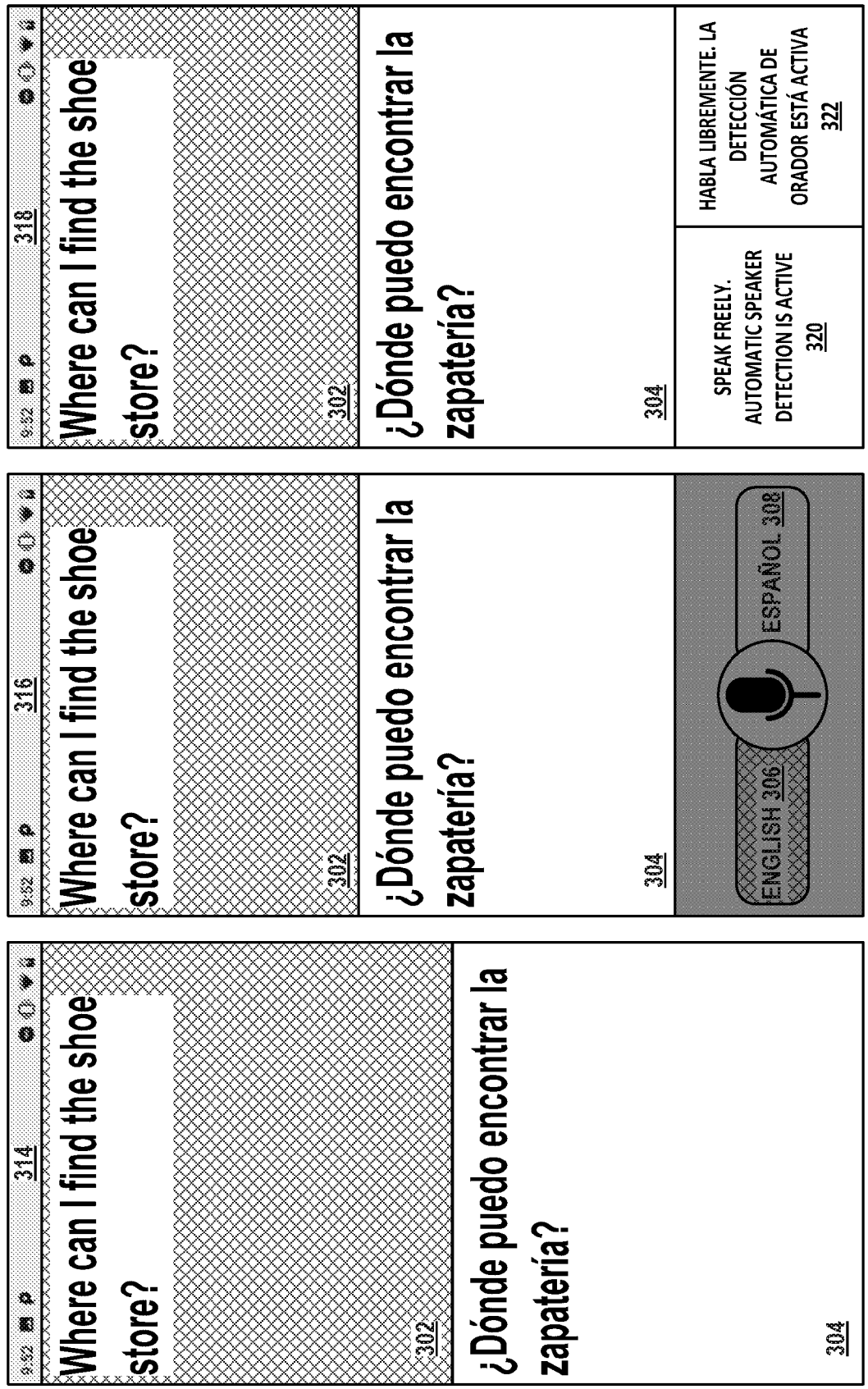
Figure 3C:
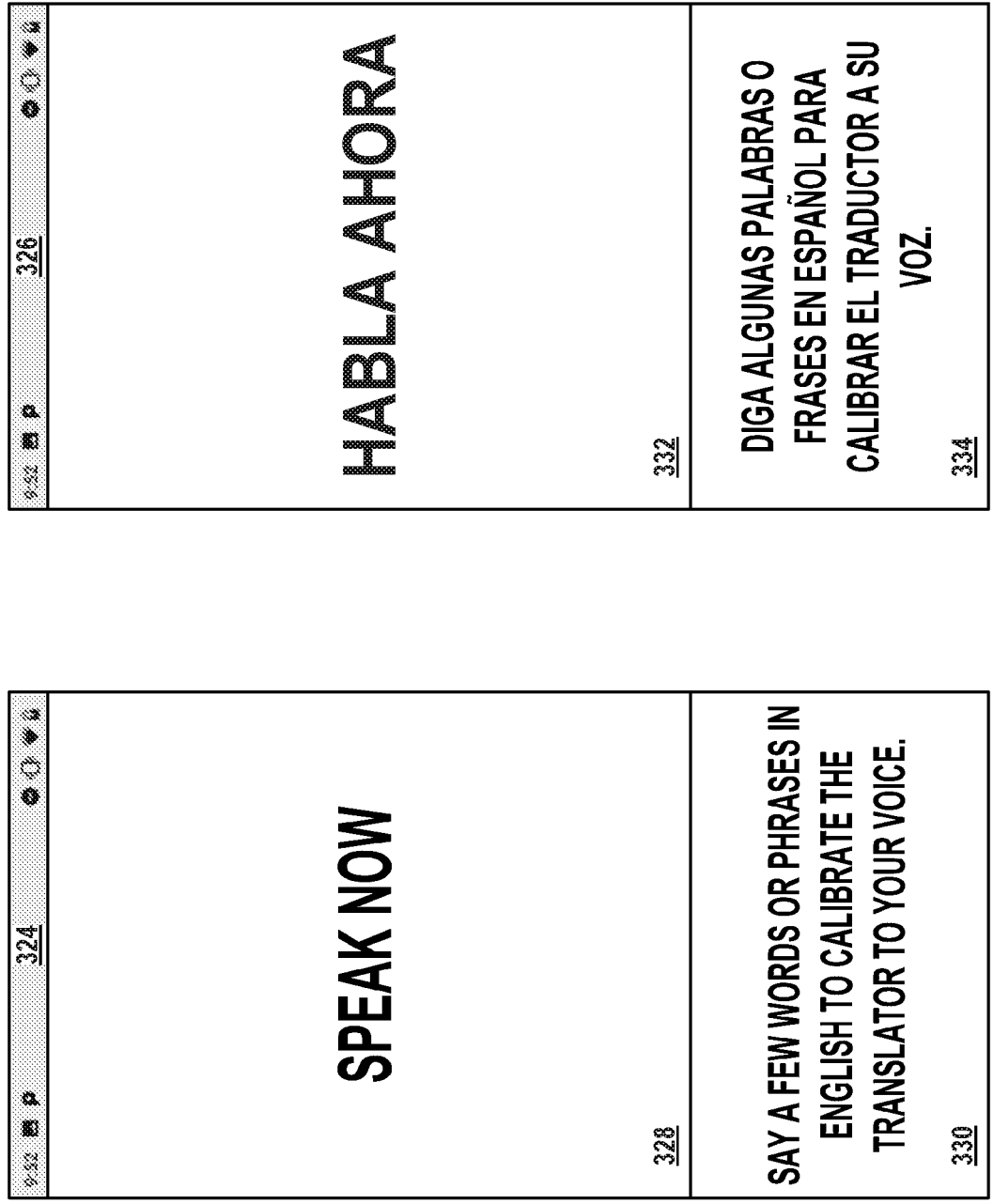

FIGS. 3A, 3B, and 3C illustrate example user interfaces of a translation software application ("translation application"). Specifically, the translation application is configured to provide translation between two different languages as two or more users communicate with one another in the two different languages. User interface (UI) 300 in FIG. 3A illustrates that the translation application includes first button 306 that corresponds to a first language and second button 308 that corresponds to a second language. In the example shown in FIGS. 3A, 3B, and 3C, the first language is English and the second language is Spanish. However, translation between any two languages may be provided by the translation application. UI 300 also includes first display region 302 configured to display text in the first language and second display region 304 configured to display text in the second language.

Translation of utterances (e.g., spoken words, phrases, and/or sentences) may be initiated based on or in response to detection of interaction with button 306 or button 308. For example, a first speaker may select button 306 (e.g., by touching the UI), as illustrated by cross-hatching of button 306 in UI 310, which may cause the translation application to start listening for first utterances. UI 310 may thus display a visual prompt "SPEAK NOW," indicating that a first speaker should speak one or more utterances in English in order to have these utterances translated into Spanish. In some implementations, the microphone icon between buttons 306 and 308 may move (e.g., shake, vibrate) or alter its appearance in order to indicate the translation application is listening.

Based on the captured first utterances of the first speaker, the translation application may display, in region 302, a textual representation of the utterances in English (i.e., "Hello, how are you?") and, in region 304, a textual representation of the utterances translated into Spanish (i.e., "Hola, cómo estás?"). A second speaker may read the Spanish text in region 304 and formulate a response. In order to indicate that the second speaker is speaking, the second speaker may select button 308, as illustrated by hashing of button 308 in UI 312, which may cause the translation application to start listening for second utterances. UI 312 may thus display a visual prompt "HABLA AHORA," indicating that a second speaker should speak one or more utterances in Spanish in order to have these utterances translated into English.

Based on the captured second utterances of the second speaker, the translation application may display, in region 304, a textual representation of the utterances in Spanish (i.e., "¿Bien, y tú?") and, in region 304, a textual representation of the utterances translated into English (i.e., "Good, and you?"). The first speaker may read the English text in region 302 and formulate a response. The conversation may continue, with each user hitting their respective button, speaking, and giving the other speaker a chance to respond.

In some implementations, such turn-taking may continue indefinitely, for example, until the conversation between the two speakers ends. However, such turn-taking may be cumbersome and may suffer from issues like premature end-pointing (i.e., the translation application stopping listening before a speaker has finished speaking) and/or overdue end-pointing (i.e., the translation application continuing to listen for some time after the speaker has finished speaking). Namely, when the speaker presses their respective button too late relative to when they begin speaking, the beginning of the utterance may be cut off. Similarly, when the speaker is in a noisy environment, the translation application might not be able to detect a period of silence long enough (e.g., 2.5 seconds) to stop listening, thus resulting in listening after the speaker has stopped speaking.

Accordingly, the systems, methods, and devices disclosed herein may be configured to phase out the need for explicit indicators/indications of who is speaking. Such indication of who is speaking may be herein referred to as hint data, identity data, or identity hint data. Namely, a diarization model may be trained based on information obtained during one or more initial rounds of turn taking to determine the sound of a voice of the person who is speaking. Notably, diarization is a process of partitioning or dividing an audio waveform into sections according to speaker identity.

Once trained, the diarization model may determine who is speaking without any explicit indications of the speaker. At this point, the UI of the translation application may be modified to indicate that speakers can speak freely, without needing to indicate by way of the UI who is about to speak. Further, as the diarization model is used to identify the speaker, this additional information may be used to update and adapt the diarization model, allowing the model to become increasingly accurate at identifying the speaker as the conversation goes on.

FIG. 3B illustrates examples UIs that may be used to indicate that translation application has entered and/or is operating in a mode where explicit indication of the speaker does not need to be provided. For example, the translation application may enter this mode in response to the diarization model reaching a threshold level of accuracy in predicting the speaker.

In a first example, UI 314 may indicate to the speakers that the translation application no longer requests explicit indication of who is speaking or is about to speak by ceasing to display buttons 306 and 308. Additionally, regions 302 and 304 may be expanded to fill the space previously dedicated to buttons 306 and 308. Thus, for example, the first speaker my say "Where can I find the shoe store?" without providing any cues. The diarization model may be configured to determine that this utterance corresponds to the first speaker and may responsively translate the utterance into Spanish, thus displaying "¿Dónde puedo encontrar la zapatería?" in region 304. The visual representation of region 302 may be adjusted, modified, or altered (e.g., cross-hatched in UI 314) to provide to the first speaker visual feedback indicating that the translation application has identified the first speaker even though no explicit indication of this speaker was provided. Similarly, when the second user beings speaking, the visual representation of region 304 may be adjusted, modified, or altered to provide to the second speaker similar visual feedback.

Similarly, in a second example, UI 316 may indicate that the translation application is configured to automatically identify the speaker by adjusting the visual representation of buttons 306 and 308. In UI 316, buttons 306 and 308 are shown grayed-out to indicate that these buttons are no longer active and/or configured to receive input. The visual change from, for example, UI 312 to UI 316 may provide an additional visual cue of the translation application's transition to the automatic speaker recognition mode.

Further, in a third example, UI 318 may explicitly indicate by way of prompts 320 and 322 that the speakers can speak normally, and the translation application will automatically identify the speaker. Namely, prompt 320, directed at the first English speaker, may state "SPEAK FREELY. AUTOMATIC SPEAKER DETECTION IS ACTIVE," while prompt 322 may state the same in Spanish. That is, prompt 322, directed at the second Spanish speaker may state "HABLA LIBREMENTE. LA DETECCIÓN AUTOMÁTICA DE ORADOR ESTÁ ACTIVA."

In an alternative embodiment, the one or more initial rounds of explicit turn-taking may be replaced or supplemented by an initial training period. This initial training period may take place outside of normal conversation. Namely, each of the two speakers may be asked to say a few words or phrases in their respective language to calibrate the translation application to their respective voice, as illustrated by FIG. 3C. In some implementations, each speaker may be asked to say a specific series of words or phrases selected or determined by the translation application so as to maximize the range of sounds that each speaker generates in pronouncing these words or phrases. Such an approach may reduce the duration of the initial training/calibration period.

Namely, as shown in UI 324, the first speaker may be provided with prompt 330, which states "SAY A FEW WORDS OR PHRASES IN ENGLISH TO CALIBRATE THE TRANSLATOR TO YOUR VOICE." Similarly, the second speaker may be asked to do the same, but in Spanish. That is, as shown in UI 326, the second speaker may be provided with prompt 334, which states "DIGA ALGUNAS PALABRAS O FRASES EN ESPAÑOL PARA CALIBRAR EL TRADUCTOR A SU VOZ." Prompt 328 may additionally instruct the first speaker to "SPEAK NOW," and prompt 332 may do the same for the second speaker (i.e., "HABLA AHORA").

Thus, for example, while UI 324 is displayed, the first speaker may speak until UI 324 changes to UI 326, indicating that sufficient training data has been collected. Similarly, while UI 326 is displayed, the second speaker may speak until UI 326 changes to a subsequent UI (e.g., UI 318) indicating that the diarization model has been trained, the translation application is automatically detecting the speaker, and the conversation can thus proceed naturally. In this case, the utterances obtained while UIs 324 and 326 are displayed may serve the same purpose as the utterances obtained using buttons 306 and 308 (i.e., both approaches generate hint/identity data). Notably, however, the use of buttons 306 and 308 may have the advantage of allowing the conversation to start more naturally, without an explicit calibration period during which the two individuals are not conversing.

Figure 3D:
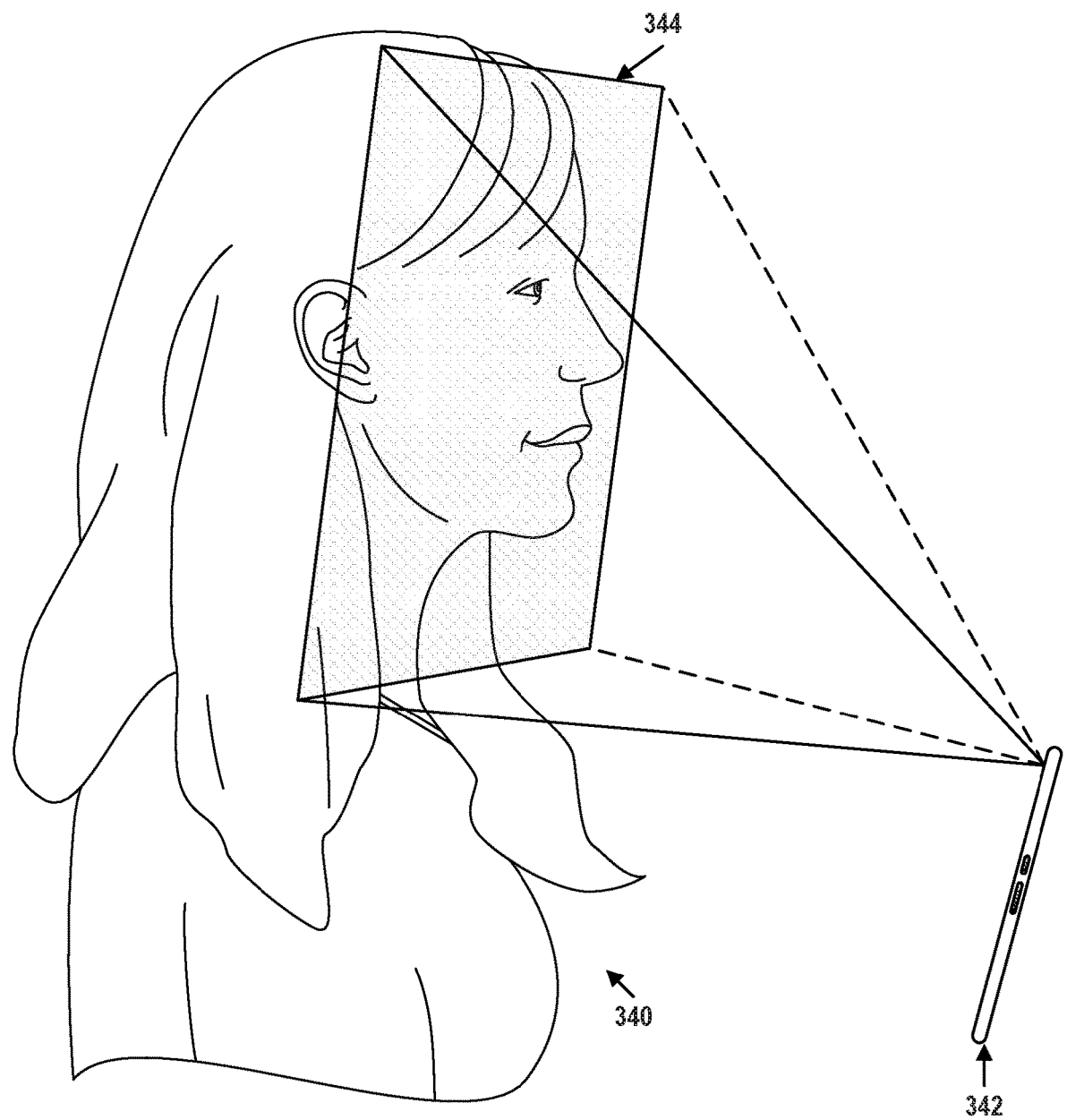
FIG. 3D illustrates image capture by a computing device, in accordance with example embodiments.

In a further embodiment illustrated in FIG. 3D, the hint data may be obtained on the basis of sensor data. For example, as speaker 340 generates utterances (i.e., speaks), computing device 342 may use one or more image sensors thereon to capture one or more images of speaker 340, as indicated by field of view 344. These images may be visible light images (e.g., generated by front-facing camera 104 and/or rear-facing camera 112), infrared images (e.g., generated by front-facing infrared camera 114, first infrared pattern projector 116, and/or second infrared pattern projector 118, or a combination thereof. The one or more images may be synchronized with the captured audio waveform such that utterances can be mapped to facial (e.g., mouth) movements and/or an identity of the speaker represented in the one or more images.

Thus, the translation application may determine the speaker associated with a particular utterance based on the one or more images. In the case of a portable computing device, when a speaker is actively speaking, the portable computing device may be held so as to capture images of the active speaker's face, as illustrated in FIG. 3D. Accordingly, by determining whether a particular image represents the first speaker or the second speaker, the translation application may determine the source of the corresponding utterances. In some implementations, the translation application may additionally determine that successive images represent facial movements that correspond to and/or are consistent with the corresponding utterances. In the case of a computing device having one or more cameras with a field of view large enough to simultaneously see both speakers (e.g., in the context of a video conference), facial movements, rather than identity, may be used to determine the source speaker. Notably, speaker identity may nevertheless also be considered, for example, as speakers move through an environment monitored by the one or more cameras.

Such visual information may be used both as hint data for training of the diarization model and as a way to verify whether the diarization model accurately determined the source speaker. For example, when image data is available, the translation application might not include buttons 306 and 308 and/or the calibration process illustrated in FIG. 3C. Instead, utterances in the waveform may be mapped to a corresponding speaker based on the image data, thereby generating the hint data which can be used to train the diarization model. Once the diartization model is trained, the translation application may cease relying on additional image data. Alternatively, the translation application may continue to obtain additional image data and may determine whether the source speaker determined by the diarization model matches the speaker represented in the images and/or whose facial movements indicate speech.

Further, in some implementations, the translation application may employ any combination of the features of FIGS. 3A, 3B, 3C, and 3D to train and update the diarization model. Some implementations may also rely on additional sensor data besides image data that may be indicative of speaker identity. For example, inertial data from an inertial measurement unit (IMU) may indicate physical hand-off or hand-over of the computing device between different speakers, thus hinting that the next utterances are likely to be produced by a speaker different than that which produced preceding utterances.

IV. Example Systems

Figure 4:
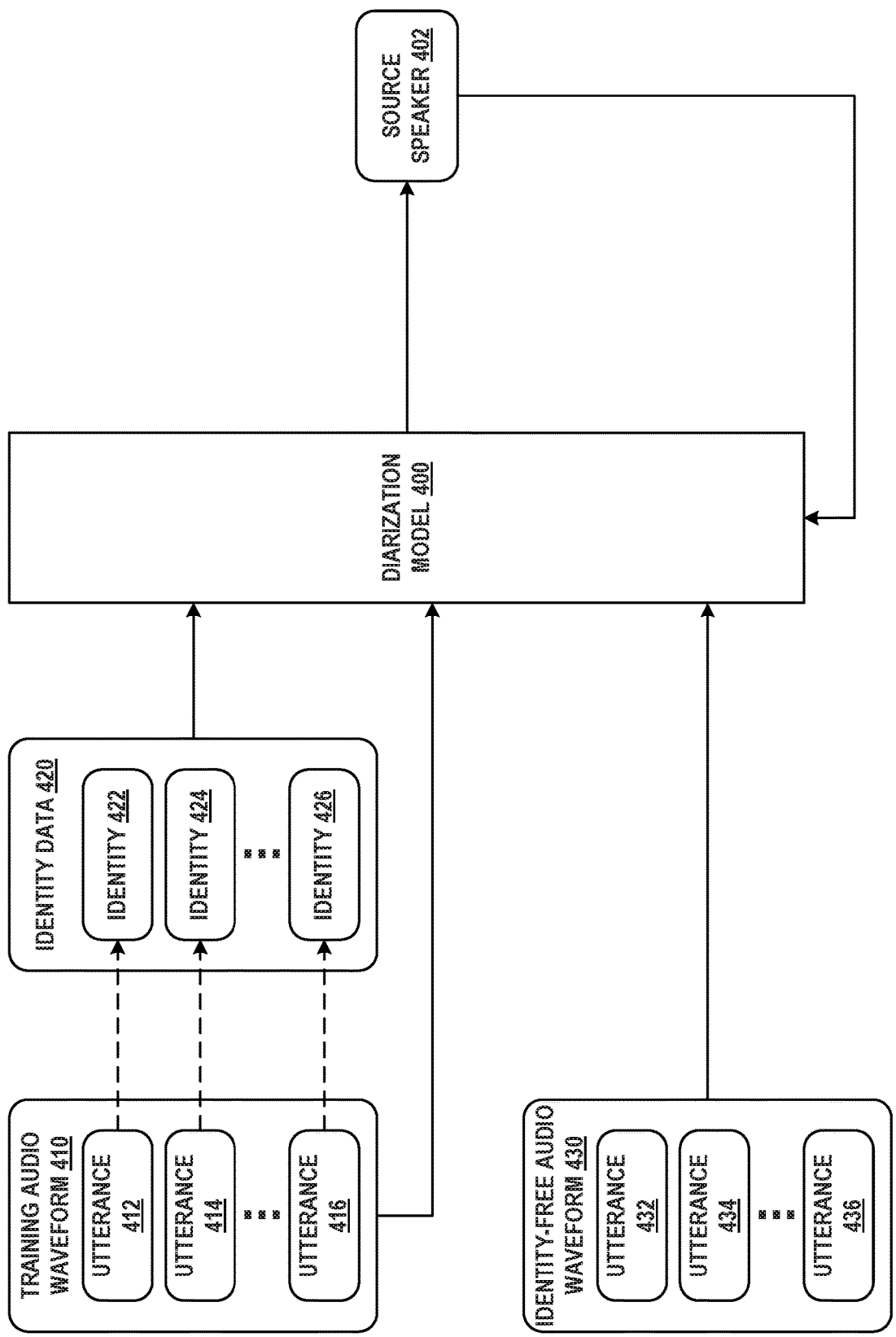
FIG. 4 illustrates a block diagram of a system, in accordance with example embodiments.

FIG. 4 illustrates an example diarization model 400 used to determine, predict, and/or estimate source speaker 402 of an utterance. Diarization model 400 may be trained to identify source speaker 402 using training audio waveform 410 and identity data 420. Training audio waveform 410 may represent, for example, audio captured while the first and second speakers are using buttons 306 and 308 to take turns speaking during a conversation, audio captured during an initial calibration period, and/or audio captured while image data indicating the source speaker is also captured.

Training audio waveform 410 may include a plurality of utterances, including utterances 412-416 (i.e., utterance 412 and utterance 414 through utterance 416). Each of these utterances may be mapped to corresponding identity data, which may include identities 422-426 (i.e., identity 422 and identity 424 through identity 426). That is, portions of training audio waveform 410 may be associated with a corresponding speaker. Identity data 420 may be generated based on turn taking using buttons 306 and 308, speech captured during initial calibration, and/or image or other sensor data indicative of the speaker at a particular time. Each utterance may have a predetermined duration of, for example 250 milliseconds. However, diarization model 400 may additionally or alternatively be trained to handle utterances having different durations.

Diarization model 400 may be trained using training audio waveform 410 and identity data 420 until, for example, diarization model reaches at least a threshold level of accuracy in correctly identifying source speaker 402. For example, a first portion of utterances 412-416 may be used to train diarization model 400, while a second different portion of utterances 412-416 may be used to determine whether the trained diarization model 400 accurately determines source speaker 402. For example, utterance 414 may be provided as input to test diarization model 400, and the determined source speaker 402 may be compared to identity 426 to determine whether the two are a match. When at least a threshold fraction of such testing is successful, diarization model 400 may be used to classify new utterances (i.e., the translation application may automatically recognize the speaker without relying on hint data).

Thus, diarization model may be used to determine the source speaker of utterances in identity-free audio waveform 430. That is, diarization model may receive identity-free audio waveform 430 and may assign to each of utterances 432-436 (i.e., utterance 432 and utterance 434 through utterance 436) a corresponding source speaker 402. Notably, audio waveform 430 may be referred to as identity-free, identity-independent, and/or identity-exclusive because it is not associated with corresponding identity data. That is, audio waveform 430 may be captured once the translation application has entered the mode in which it automatically determines the source speaker of each utterance.

Diarization model 400 may be updated and adjusted based on source speaker 402 determined for utterances 432-436. That is, diarization model 400 may continue to adapt in an unsupervised manner even when further identity data is not available. In one implementation, diarization model 400 may be updated based on each instance of the determined source speaker 402. That is, each time a new utterance is classified as belonging to the first speaker, the second speaker, or some other speaker, this classification may be assumed to be accurate and thus used to update diarization model 400. In another implementation, diarization model 400 may be updated when a confidence level associated with a determination of source speaker 402 exceeds a threshold confidence level. For example, when a confidence of diarization model 400 in predicating source speaker 402 exceeds 85%, the corresponding utterance and determined source speaker may be added to diarization model 400 as further training data.

In a further implementation, training data obtained on the basis of training audio waveform 410 and identity data 420 (i.e., supervised training data) may be assigned different weights than training data obtained on the basis of identity-free audio waveform 430 (i.e., unsupervised training data). Namely, supervised training data may be assigned higher weights than unsupervised training data. Thus, any misclassifications by diarization model 400 might not appreciably affect the accuracy of further classifications, as diarization model 400 may be largely determined by the initial supervised training data and a large amount of correctly-classified unsupervised training data.

V. Example Diarization Model Training and Adaptation

Figure 5A:
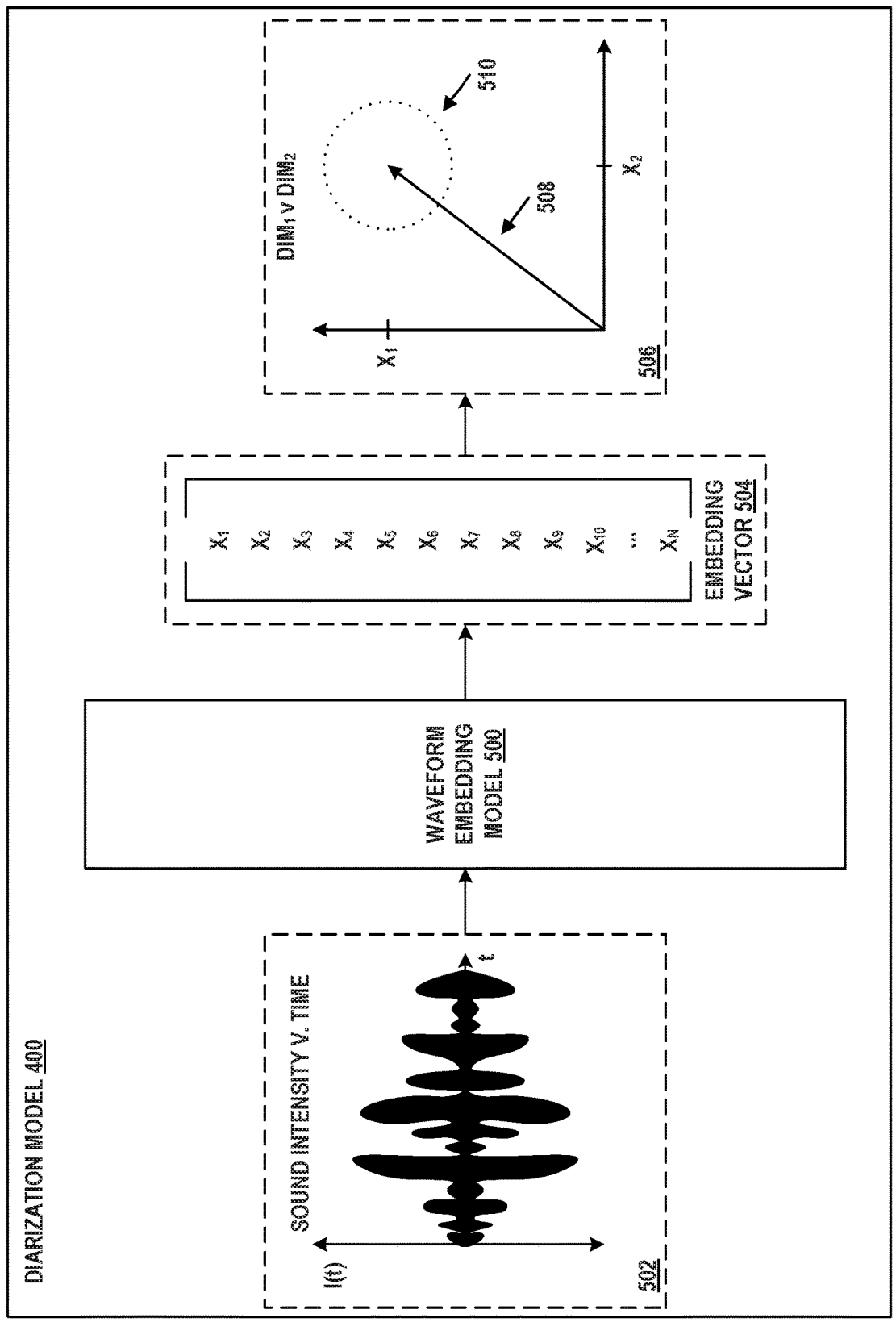
FIGS. 5A, 5B, 5C, 6A, and 6B illustrate a diarization model, in accordance with example embodiments.
Figure 5B:
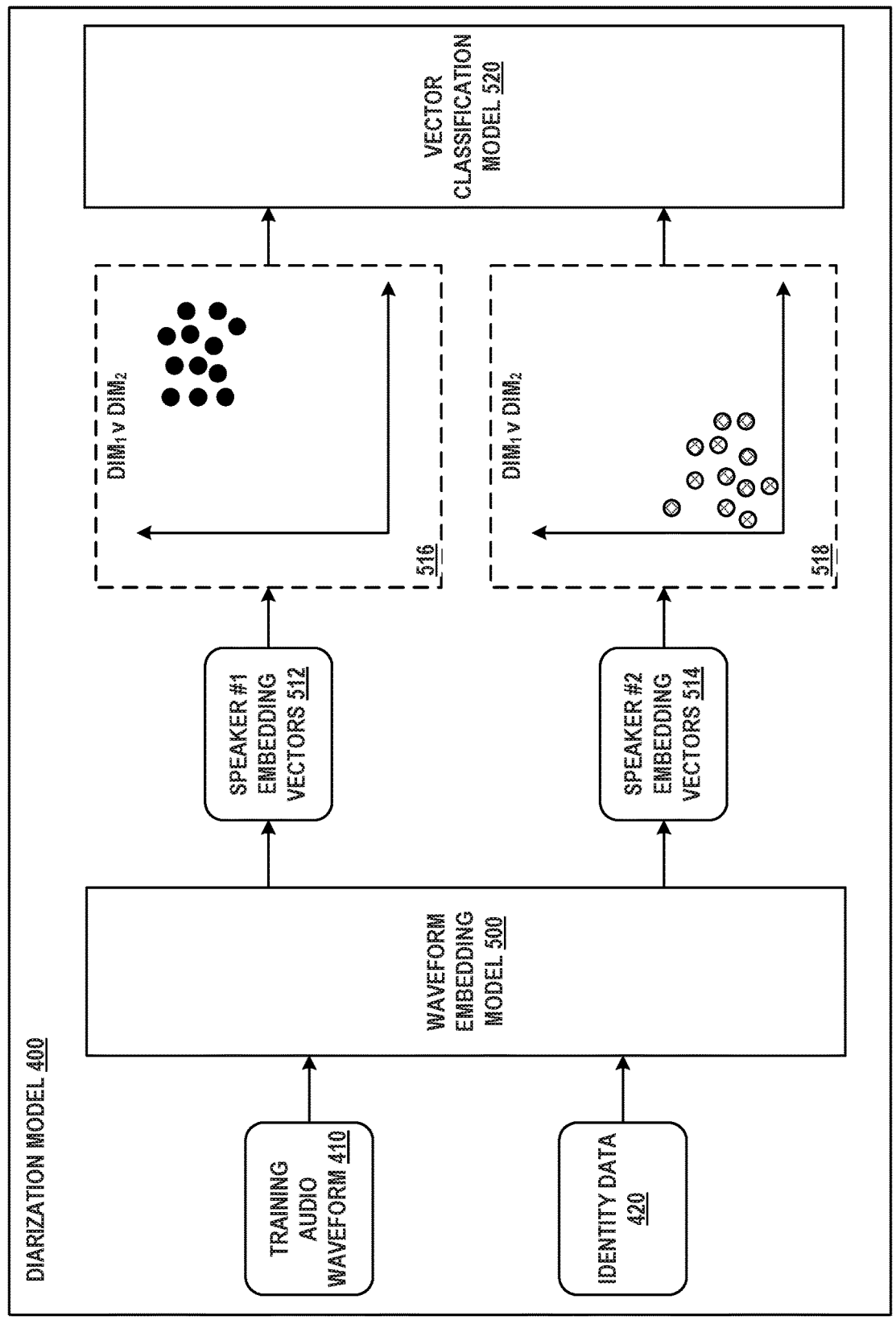
Figure 5C:
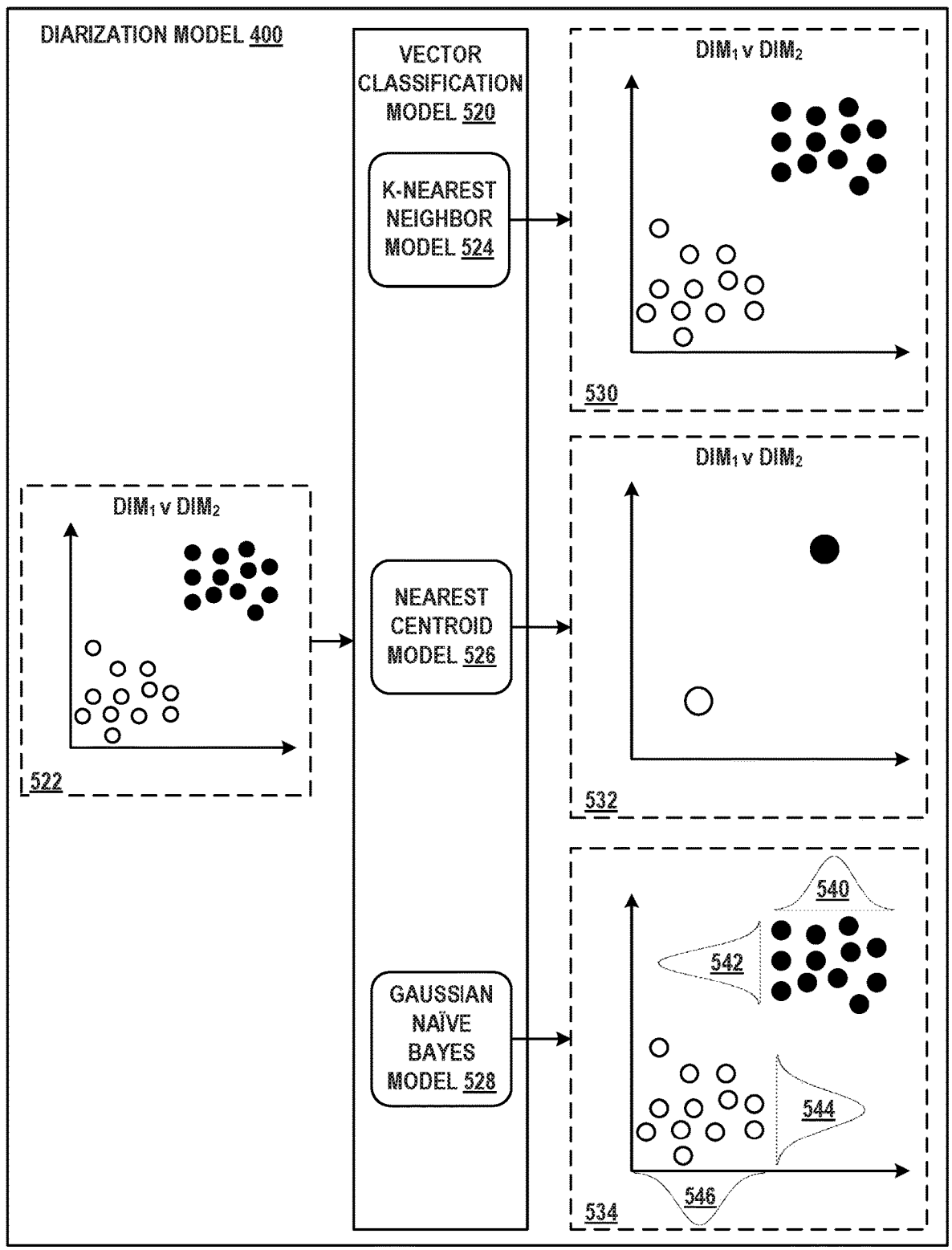

FIGS. 5A, 5B, and 5C illustrate an example waveform processing pipeline of diarization model 400. Specifically, diarization model may include waveform embedding model 500 and vector classification model 520. Waveform embedding model 500 defines a mathematical transformation of samples that make up an audio waveform (and can be said to define a waveform space) into an N-dimensional vector space. Accordingly, waveform embedding model 500 may be configured to generate embedding vector 504 based on audio waveform 502. Audio waveform 502 may represent a single utterance having a predetermined duration and/or a predetermined number of samples. Embedding vector 504 may include a plurality of values $X_1$-$X_N$ (i.e., $X_1$, $X_2$, $X_3$, $X_4$, $X_5$, $X_6$, $X_7$, $X_8$, $X_9$, and $X_{10}$ through $X_N$) that represent audio waveform 502 in an N-dimensional vector space.

Waveform embedding model 500 may be implemented as software instructions executable by a processor (e.g., processor 206), as programmable circuitry (e.g., field-programmable gate array (FPGA)), as purpose-built circuitry (e.g., ASIC), or a combination thereof. Waveform embedding model 500 may be defined empirically through training based on a plurality of sample waveforms that represent a plurality of sample utterances by a plurality of sample speakers. That is, the parameters of waveform embedding model 500 may be learned by a computing device, rather than being predetermined by a programmer. Waveform embedding model may include and/or be made up of an artificial neural network (ANN) (e.g., deep ANN).

Notably, waveform embedding model 500 may be trained using a loss function such that respective embedding vectors of voices of two speakers that sound similar are close together in the N-dimensional vector space, while respective embedding vectors of voices of two speakers that sound significantly different are far apart in the N-dimensional vector space. For example, the loss function may cause audible voice features with the same label (e.g., speaker age, speaker gender, speaker voice range, speaker voice timbre, etc.) to be grouped together and audible voice features with different labels to be pushed apart in the vector space. Waveform embedding model 500 may be trained before it is employed as part of the translation application (e.g., before the translation application is used to translate speech), although it may be periodically updated. In contrast, as will be explained, vector classification model 520 may be trained while translation application is used to translate speech.

Values $X_1$-$X_N$ of embedding vector 504 may be representative of the physical properties or characteristics associated with audio waveform 502. Thus, values $X_1$-$X_N$ may be used to determine the similarity of the properties or characteristics of two different utterances. Namely, a distance between the corresponding embedding vectors in the N-dimensional space of the two different utterances may be indicative of a similarity between the two different utterances. For example, when the distance is small, the physical properties of the two utterances may be more similar than when the distance is large. A subset of the values of the vectors may be graphed to illustrate the degree of similarity between the physical properties of the two different utterances. To that end, FIG. 5A illustrates graph 506 of value $X_1$ of a first dimension $DIM_1$ of embedding vector 504 and $X_2$ of a second dimension $DIM_1$ of embedding vector 504 plotted along the horizontal and vertical axis, respectively. Graph 506 may be a dimensionally-reduced version of embedding vector 504 generated for purposes of illustration, while the entirety of embedding vector 504 may be used for other purposes.

Other vectors falling within threshold 510 of graphical representation 508 of embedding vector 504 may be considered similar in that they represent the audio waveforms of utterances that have similar physical properties or characteristics. Notably, although graph 506 shows only two dimensions for simplicity of illustration, the concepts herein discussed may be expanded to N-dimensions. For example, in the case of three dimensions, threshold 510 may be represented graphically as a sphere rather than a circle. In one example, the distance between two vectors may be the Euclidean distance. That is, for a first vector X1 having values $X1_1$ through $X1_N$ and a second vector X2 having values $X2_1$ through $X2_N$, the distance d may be defined as $d(X1, X2) = \sqrt{(X1_1-X2_1)^2+(X1_2-X2_2)^2+...+(X1_N-X2_N)^2}$. In another example, the distance between the two vectors may be the cosine distance or another measure of distance. Thus, utterances having similar physical properties may generate waveforms that, when embedded in the N-dimensional space defined by waveform embedding model 500, fall within a threshold distance of one another.

In some cases, some of the values $X_1$-$X_N$ may be human-interpretable. That is, some of the values may provide explicit metrics of the physical properties of the utterance represented by audio waveform 502. In other cases, values $X_1$-$X_N$ might not be human interpretable, but may nevertheless be interpretable by, for example, vector classification model 520 and be used in determining a speaker of the utterance. Thus, while values $X_1$-$X_N$ might not themselves be human-interpretable, values $X_1$-$X_N$ may be combined, transformed, and/or otherwise processed by further models and/or algorithms to generate human-interpretable outputs.

FIGS. 5B and 5C illustrate an example training process of diarization model 400. Namely, training audio waveform 410 and identity data 420 may be provided as input to waveform embedding model 500. Training audio waveform may include a first plurality of utterances by a first speaker and a second plurality of utterances by a second speaker, each of which may be designated, indicated, or otherwise labeled by identity data 420. Based on the first plurality of utterances, waveform embedding model 500 may be configured to generate a first plurality of embedding vectors 512 for the first speaker and a second plurality of embedding vectors 514 of the second speaker. Embedding vectors 512 are shown in graph 516 and embedding vectors are shown in graph 518 to illustrate that the embeddings of different speakers may be spatially separated in vector space. Notably, graphs 516 and 518 illustrate two dimensions of the respective embedding vectors for clarity of illustration. Embedding vectors 512 and 514 may include a plurality of additional dimensions not shown in graphs 516 and 518 but which may be used in speaker diarization.

Embedding vectors 512 and embedding vectors 514 generated by waveform embedding model 500 may be provided as input to vector classification model 520. As illustrated by FIG. 5B, vector classification model may include one or more of k-nearest neighbor model 524, nearest centroid model 526, and/or Gaussian Naive Bayes model 528, among other similar possible machine learning models. Each of models 524, 526, and 528 may be configured to classify a vector among one or more categories (e.g., first speaker vs second speaker). FIG. 5C also illustrates the embedding vectors of graphs 516 and 518 combined into single graph 522. Notably, embedding vectors 512 and embedding vectors 514 each form a distinct cluster of points, thus allowing classification of further embedding vectors based on proximity to either cluster.

Training diarization model 400 may involve training one or more of k-nearest neighbor model 524, nearest centroid model 526, and/or Gaussian Naive Bayes model 528. Training k-nearest neighbor model 524 may involve computing embedding vectors 512 and 514 by way of waveform embedding model 500. In other words, as a result of the properties of this type of model, training may simply involve determining the embeddings of the first plurality of utterances and the second plurality of utterances, without any additional transformation of these embeddings. Thus, graph 530 of k-nearest neighbor model 524 and graph 522 are identical. An embedding vector corresponding to an unclassified utterance may be classified as belonging to either the first speaker or the second speaker based on the k (e.g., 3) points within graph 530 that are closest to this embedding vector.

On the other hand, training nearest centroid model 526 may involve determining the centroids of embedding vectors 512 and embedding vectors 514. Graph 532 illustrates a first centroid (black) of embedding vectors 512 and a second centroid (cross-hatched) of embedding vectors 514. Each centroid may represent the spatial average of its respective set of embedding vectors. When the embedding vectors are assigned weights, the spatial average may be weighted according to such weights. An embedding vector corresponding to an unclassified utterance may be classified as belonging to either the first speaker or the second speaker based on the embedding vector being closer to either the first centroid or the second centroid.

Further, training Gaussian Naive Bayes model 528 may involve determining the means (i.e., averages) and standard deviations of embedding vectors 512 and embedding vectors 514. Thus, a respective Gaussian (i.e., a normal distribution) may be fitted to embedding vectors 512 with respect to each dimension thereof, and a respective Gaussian may be fitted to embedding vectors 514 with respect to each dimension thereof. Graph 534 illustrates first Gaussian 540 of embedding vectors 512 with respect to the first dimension thereof and second Gaussian 542 of embedding vectors 512 with respect to the second dimension thereof. Similarly, graph 534 also illustrates first Gaussian 546 of embedding vectors 514 with respect to the first dimension thereof and second Gaussian 544 of embedding vectors 514 with respect to the second dimension thereof. Each of Gaussians 540, 542, 544, and 546 may be associated with a corresponding mean and standard deviation.

An embedding vector corresponding to an unclassified utterance may be classified as belonging to either the first speaker or the second speaker based on the embedding vector being more likely to belong to either the Gaussians of the first speaker (e.g., 540 and 542) or the Gaussians of the second speaker (e.g., 544 and 546). Specifically, this likelihood may be computed by applying Bayes rule/theorem in combination with the probabilities indicated by the respective Gaussians. Namely, according to Bayes rule, the probability of the speaker being the first speaker $S_1$ given that embedding vector E was observed is $$P(S_1|E) = \frac{P(E|S_1)P(S_1)}{P(E)}$$

and the probability of the speaker being the second speaker $S_2$ given embedding vector E was observed is $$P(S_2 \mid E) = \frac{P(E \mid S_2)P(S_2)}{P(E)}.$$

Figure 6A:
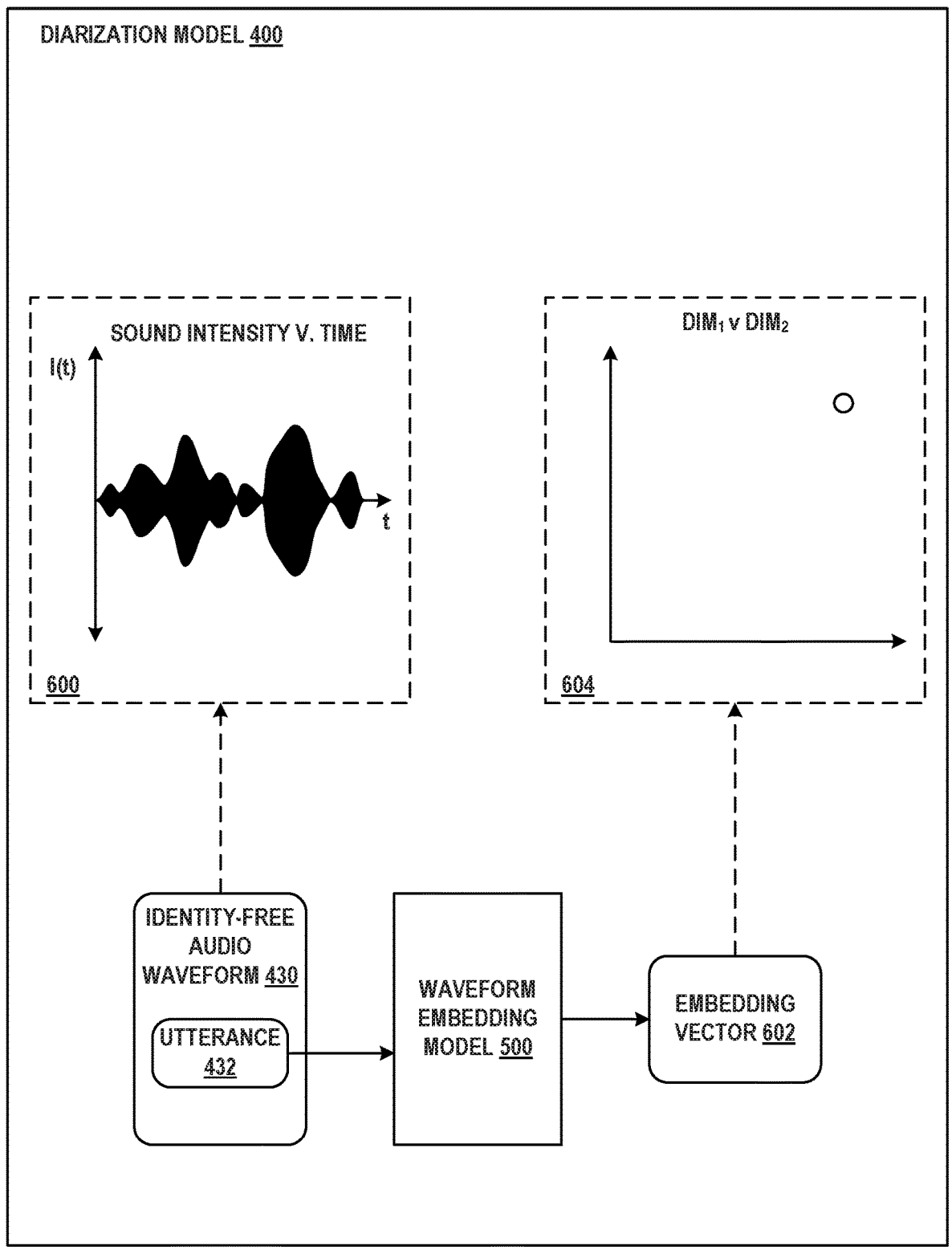
Figure 6B:
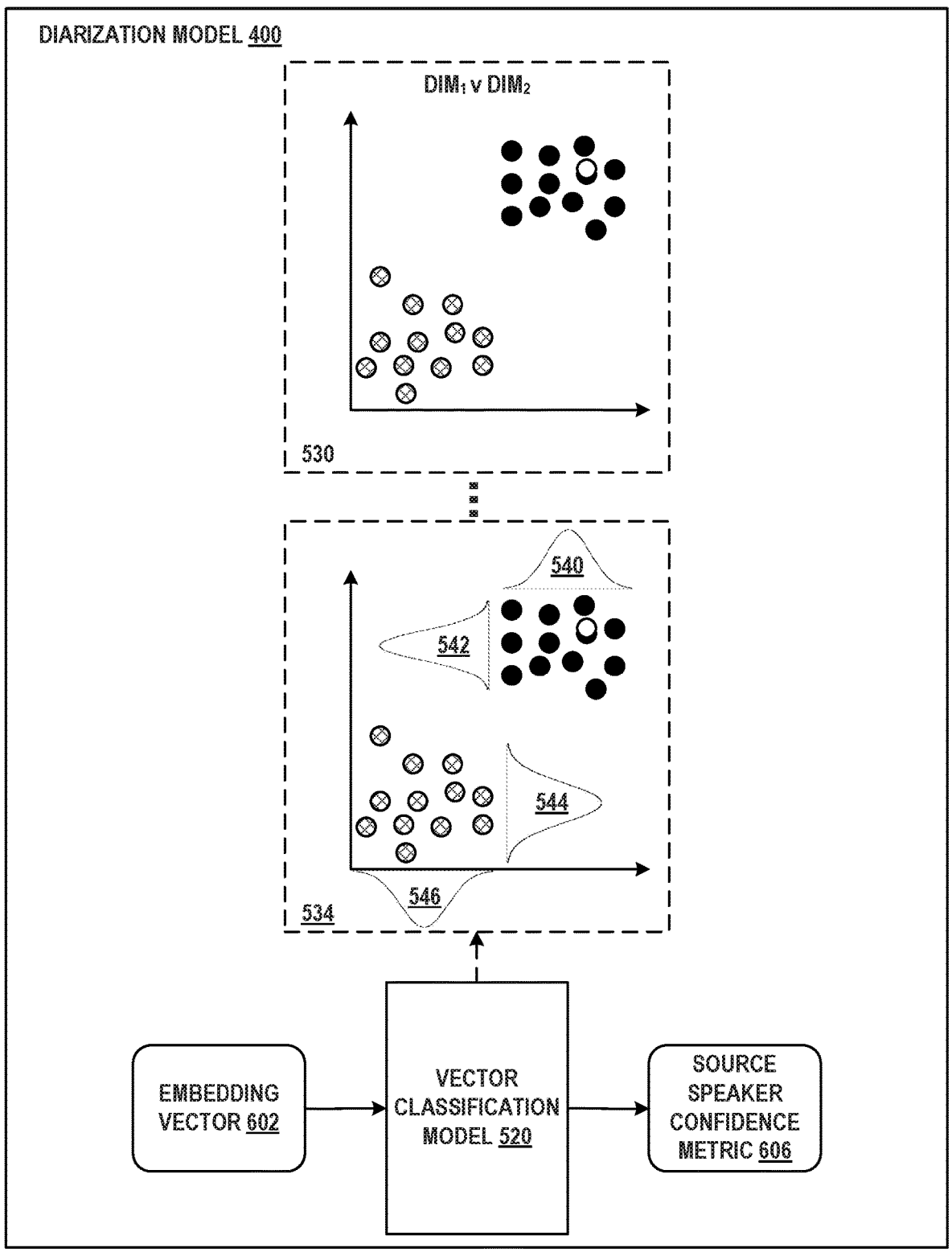

Once trained, diarization model 400 may be used to identify the speaker of new utterances. FIGS. 6A and 6B illustrate trained diarization model 400 operating on, for example, utterance 432 in identity-free audio waveform 430. Utterance 432 is illustrated in graph 600. Utterance 432 is provided as input to waveform embedding model 500, which generates embedding vector 602 based thereon. The values of two dimensions of embedding vector 602 are shown by graph 604.

Embedding vector 602 is then provided as input to vector classification model 520, which may compare embedding vector 602 against one or more of models 524, 526, and/or 528 to determine source speaker confidence metric 606. Graph 530, for example, illustrates embedding vector 602 (white dot) graphed alongside embedding vectors 512 (black dots) and embedding vectors 514 (cross-hatched dots). The three nearest neighbors of embedding vector 602 are black dots. Accordingly, embedding vector 602 may be classified as belonging to the cluster of black dots, and thus representing the voice of the first speaker. In the case of k-nearest neighbor model 524, an unclassified embedding vector may be classified on the basis of the class of the majority of the k-nearest other embedding vectors. Source speaker confidence metric 606 may be equal to the number of embedding vectors making up the majority divided by k. Thus, for example, if four black dots and one white dot were the vectors nearest embedding vector 602, confidence metric 606 would be equal to 4/5. Notably, in some cases, the computation of confidence metric 606 may take into account the weight associated with each embedding vector and/or the distance between embedding vector 602 and each of the k nearest vectors.

Although a graph of nearest centroid model 526 is not shown, embedding vector 602 may be similarly graphed relative to the two centroids shown in graph 532. Embedding vector 602 may be classified based on being closer to one of the two centroids than to the other. For example, embedding vector 602, as shown in graph 604, is closer to the first black centroid shown in graph 532 than to the second cross-hatched centroid. Accordingly, embedding vector 602 would be classified as representing the voice of the first speaker. Confidence metric 606, represented by the variable C, may be computed according to $$C = 1 - \frac{D_1}{D_1 + D_2},$$

where $D_1$ represents the distance between embedding vector 602 and the first centroid (or some trigonometric component of this distance) and $D_2$ represents the distance between embedding vector 602 and the second centroid (or some trigonometric component of this distance).

Further, graph 534 illustrates embedding vector 602 (white dot) graphed alongside Gaussians 540, 542, 544, and 546 of Gaussian Naive Bayes model 528. As discussed above, embedding vector 602 may be classified as belonging to either the first speaker or the second speaker based on the likelihood that embedding vector 602 is observed as part of the Gaussians of the first speaker (e.g., 540 and 542) or the Gaussians of the second speaker (e.g., 544 and 546). In this case, confidence metric 606 may be the greater of (i) the probability that embedding vector 602 is observed as part of the Gaussians of the first speaker or (ii) the probability that embedding vector 602 is observed as part of the Gaussians of the second speaker.

In some implementations, the speaker determined by vector classification model 520 may be output by diarization model 400 as source speaker 402 when source speaker confidence metric 606 exceeds a threshold confidence value (e.g., 75%). When confidence metric 606 is below the threshold confidence value, diarization model 400 may indicate that source speaker 402 cannot be determined with a sufficient accuracy.

Further, once diarization model 400 determines the source speaker of embedding vector 602, diarization model 400 may be updated using this information. Namely, embedding vector 602 may be added to one or more of models 524, 526, and/or 528, which may be visually represented by turning the white dot representing embedding vector 602 black in graphs 530-534, adjusting the positions of the centroids, and/or adjusting the sizes of Gaussians 540, 542, 544, and/or 546. Depending on the implementation, embedding vector 602 may be used to update vector classification model 520 when confidence metric 606 exceeds some threshold level, when the classification of vector 602 is externally verifiable (e.g., based on captured image frames), by assigning a different weight to embedding vector 602 than to other vectors associated with identity data, and/or indiscriminately of any confidence and/or weight.

Notably, diarization model may be determined on a per-conversation basis. That is, each time two users have a conversation, a new diarization model may be generated, trained, used, and updated. Further, the diarization model may be generated by, executed by, and stored on the computing device executing the translation application. Accordingly, aspects of diarization model that are specific to a particular user might not be shared with other computing devices. Additionally, by executing the diarization model locally, rather than, for example, on a cloud-based platform, the amount of processing power, electrical power, and network bandwidth utilized by such a platform may be reduced. Further, the diarization model may operate with little to no latency, as it is not dependent on the speed of network connections.

In some implementations, the diarization model may be discarded once the conversation has ended. Thus, information indicative of characteristics of a speaker's voice might not be stored for longer than the duration of a single conversation. In other implementations, a portion of the diarization model associated with the owner of the computing device on which the translation application is executing may be stored to be used in further conversations, such that it does not need to be re-generated. Speakers may be able to opt-in and/or opt-out of such model storage. Thus, the manner in which the diarization model is generated, maintained, and/or discarded contributes to the privacy of speaker-specific data.

Additionally, although diarization model 400 has been herein discussed in the context of the translation application, diarization model 400 and the other techniques herein disclosed may be applied in a plurality of other applications. For example, diarization model and the corresponding UIs may be implemented as part of a voice transcription application. Namely, two or more users having a conversation in the same language may initially take turns indicating, by way of the UIs, which user is speaking. Rather than translating the utterances, the transcription application may generate a textual representation of the conversation that indicates who said what. In another example, a camera application may be configured to control a movable camera to focus on an active speaker as part of a video conference involving three or more speakers. Since the camera might not be able to simultaneously see each of the possible speakers, the camera might be rotated to a last known location of a particular speaker in response to determining that this speaker is currently speaking. Other implementations that utilize or rely on diarization are possible.

Further, while the translation application id described as being executed by a single computing device, in some embodiments, two different instances of the translation application executing on two different computing device may coordinate with one another to provide a similar translation experience. The devices may communicate wirelessly and thus allow each speaker to use their own device to converse with the other speaker.

VI. Additional Example Operations

Figure 7:
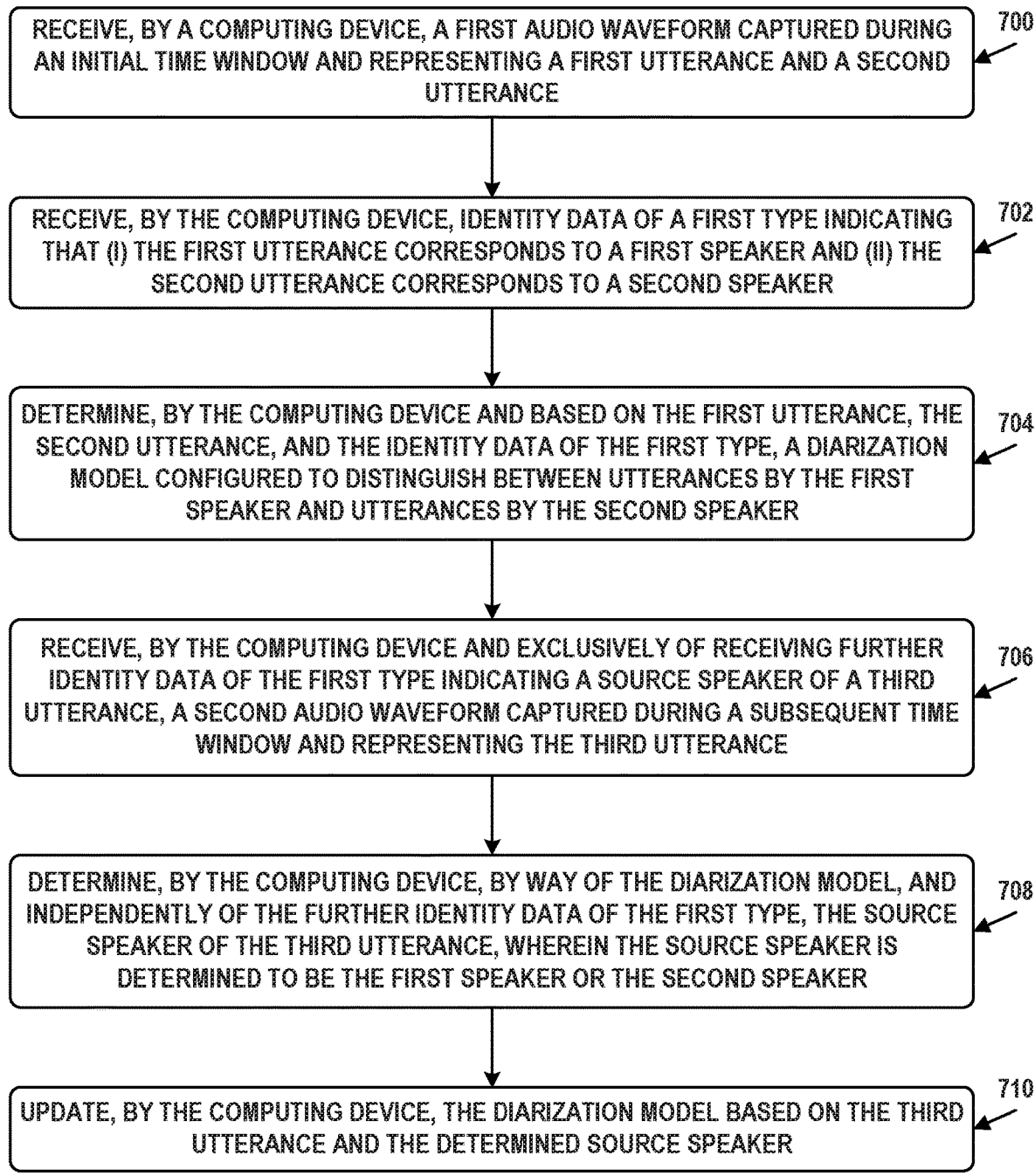
FIG. 7 illustrates a flow chart, in accordance with example embodiments.

FIG. 7 illustrates a flow chart of operations related to determining the speaker speaking at a particular time. The operations may be carried out by computing system 100, computing device 200, and/or computing device 342, among other possibilities. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 may involve receiving, by a computing device, a first audio waveform captured during an initial time window and representing a first utterance and a second utterance.

Block 702 may involve receiving, by the computing device, identity data of a first type indicating that (i) the first utterance corresponds to a first speaker and (ii) the second utterance corresponds to a second speaker.

Block 704 may involve determining, by the computing device and based on the first utterance, the second utterance, and the identity data of the first type, a diarization model configured to distinguish between utterances by the first speaker and utterances by the second speaker.

Block 706 may involve receiving, by the computing device and exclusively of receiving further identity data of the first type indicating a source speaker of a third utterance, a second audio waveform captured during a subsequent time window and representing the third utterance.

Block 708 may involve determining, by the computing device, by way of the diarization model, and independently of the further identity data of the first type, the source speaker of the third utterance. The source speaker may be determined to be the first speaker or the second speaker.

Block 710 may involve updating, by the computing device, the diarization model based on the third utterance and the determined source speaker.

In some embodiments, the computing device may be configured to display, by way of a user interface of the computing device and prior to receiving the identity data and the first audio waveform, a visual prompt for input of the identity data.

In some embodiments, the second audio waveform may be received without displaying the visual prompt for the further identity data.

In some embodiments, the first audio waveform may represent a first plurality of utterances by the first speaker and a second plurality of utterances by the second speaker. The computing device may be configured to determine an accuracy of the diarization model in distinguishing between the first plurality of utterances and the second plurality of utterances. The computing device may also be configured to determine that the accuracy exceeds a threshold accuracy and, based on determining that the accuracy exceeds the threshold accuracy, modify the user interface to remove therefrom the visual prompt.

In some embodiments, the visual prompt may include instructions indicating that (i) the first speaker is to speak for at least a first time period during the initial time window and (ii) the second speaker is to speak for at least a second time period during the initial time window. The first time period and the second time period may be mutually exclusive. Receiving the identity data may include capturing a first portion of the first audio waveform that represents the first utterance during the first time period and capturing a second portion of the first audio waveform that represents the second utterance during the second time period.

In some embodiments, receiving the identity data may further include detecting, at the computing device, a first user input which is separate from the first audio waveform. The computing device may be configured to begin capturing the first portion of the first audio waveform that represents the first utterance in response to detecting the first user input.

In some embodiments, receiving the identity data may further include detecting, at the computing device, a second user input which is separate from the first audio waveform. The computing device may be configured to begin capturing the second portion of the first audio waveform that represents the second utterance in response to detecting the second user input.

In some embodiments, receiving the identity data may include receiving, by way of a user interface of the computing device, selection of a first button corresponding to the first speaker. A first portion of the first audio waveform that represents the first utterance may be captured in response to the selection of the first button. Receiving the identity data may also include receiving, by way of the user interface, selection of a second button corresponding to the second speaker. A second portion of the first audio waveform that represents the second utterance may be captured in response to the selection of the second button.

In some embodiments, receiving the identity data may include receiving, from a camera device, first image frames representing the first speaker speaking the first utterance. A first portion of the first audio waveform that represents the first utterance may be associated with the first speaker based on the first image frames representing the first speaker speaking the first utterance. Receiving the identity data may also include receiving, from the camera device, second image frames representing the second speaker speaking the second utterance. A second portion of the first audio waveform that represents the second utterance may be associated with the second speaker based on the second image frames representing the second speaker speaking the second utterance.

In some embodiments, the diarization model may include a waveform embedding model configured to (i) receive a portion of a waveform as input and (ii) generate an embedding vector comprising a plurality of values that are representative of characteristics of the portion of the waveform. The diarization model may also include a vector classification model that includes one or more of: (i) a nearest centroid model based on the embedding vector, (ii) a k-nearest neighbor model based on the embedding vector, or (iii) a Gaussian Naive Bayes model based on the embedding vector.

In some embodiments, the vector classification model may include the nearest centroid model. Determining the diarization model may include generating, by way of the waveform embedding model, a first plurality of embedding vectors that correspond to respective first portions of the first audio waveform that represent the first utterance. Determining the diarization model may also include generating, by way of the waveform embedding model, a second plurality of embedding vectors that correspond to respective second portions of the first audio waveform that represent the second utterance. Determining the diarization model may further include determining (i) a first centroid based on the first plurality of embedding vectors and (ii) a second centroid based on the second plurality of embedding vectors.

In some embodiments, determining the source speaker of the third utterance may include generating, by way of the waveform embedding model, a third embedding vector that corresponds to a third portion of the second audio waveform that represent the third utterance. Determining the source speaker of the third utterance may also include determining (i) a first distance between the third embedding vector and the first centroid and (ii) a second distance between the third embedding vector and the second centroid. Determining the source speaker of the third utterance may further include determining that the first distance is smaller than the second distance and, based on determining that the first distance is smaller than the second distance, determining that the first speaker is the source speaker of the third utterance.

In some embodiments, the vector classification model may include the Gaussian Naïve Bayes model. Determining the diarization model may include generating, by way of the waveform embedding model, a first plurality of embedding vectors that correspond to respective first portions of the first audio waveform that represent the first utterance. Determining the diarization model may also include generating, by way of the waveform embedding model, a second plurality of embedding vectors that correspond to respective second portions of the first audio waveform that represent the second utterance. Determining the diarization model may further include determining (i) a first mean and a first standard deviation based on the first plurality of embedding vectors and (ii) a second mean and a second standard deviation based on the second plurality of embedding vectors.

In some embodiments, determining the source speaker of the third utterance may include generating, by way of the waveform embedding model, a third embedding vector that corresponds to a third portion of the second audio waveform that represent the third utterance. Determining the source speaker of the third utterance may also include determining (i) a first probability that the third embedding vector belongs to the first plurality of embedding vectors based on the first mean and the first standard deviation and (ii) a second probability that the third embedding vector belongs to the second plurality of embedding vectors based on the second mean and the second standard deviation. Determining the source speaker of the third utterance may further include determining that the first probability is higher than the second probability and, based on determining that the first probability is higher than the second probability, determining that the first speaker is the source speaker of the third utterance.

In some embodiments, determining the diarization model may include (i) generating, by way of the waveform embedding model, a first plurality of embedding vectors that correspond to respective first portions of the first audio waveform that represent the first utterance and (ii) generating, by way of the waveform embedding model, a second plurality of embedding vectors that correspond to respective second portions of the first audio waveform that represent the second utterance. The vector classification model may include the k-nearest neighbor model. Determining the source speaker of the third utterance may include generating, by way of the waveform embedding model, a third embedding vector that corresponds to a third portion of the second audio waveform that represent the third utterance. Determining the source speaker of the third utterance may also include determining k points nearest to the third embedding vector. Determining the source speaker of the third utterance may additionally include determining, for each respective point of the k points, whether the respective point belongs to the first plurality of embedding vectors or to the second plurality of embedding vectors. Determining the source speaker of the third utterance may further include determining the source speaker based on each respective point belonging to the first plurality of embedding vectors or the second plurality of embedding vectors.

In some embodiments, updating the diarization model may include determining a third plurality of embeddings of the third utterance and updating the vector classification model to include therein at least a portion of the third plurality of embeddings.

In some embodiments, updating the diarization model may include determining a confidence of the diarization model in determining the source speaker of the third utterance, determining that the confidence exceeds a threshold confidence, and updating the diarization model based on determining that the confidence exceeds the threshold confidence.

In some embodiments, each utterance that forms the diarization model may be assigned a corresponding weight within the model. Updating the diarization model may include assigning to the third utterance a third weight that is lower than at least one of (i) a first weight assigned to the first utterance or (ii) a second weight assigned to the second utterance.

In some embodiments, the computing device may be configured to receive identity data of a second type indicating that (i) the first utterance corresponds to a first speaker and (ii) the second utterance corresponds to a second speaker. The computing device may also be configured to receive further identity data of the second type indicating the source speaker of the third utterance. The computing device may be further configured to verify, based on the further identity data of the second type, the determination of the source speaker by way of the diarization model.

In some embodiments, the identity data of the first type may represent input provided by way of a user interface of the computing device. The identity data of the second type may include image data captured by way of a camera connected to the computing device.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

Where example embodiments involve information related to a person or a device of a person, some embodiments may include privacy controls. Such privacy controls may include, at least, anonymization of device identifiers, transparency, and user controls. For example, embodiments may include functionality that would enable users to modify or delete information relating to the user's use of a product.

Further, in situations where embodiments discussed herein collect personal information related to users, or may make use of personal information, the users may be provided with an opportunity to control whether programs or features collect user information (e.g., information about a user's physiology, social network, social actions or activities, profession, a user's preferences, or a user's current location). Thus, users may choose to opt-out of sharing any of the data herein discussed.

In addition, certain data may be treated in one or more ways before it is stored or used, so that personally identifiable information is removed. For example, a user's identity may be treated so that no personally identifiable information can be determined for the user (e.g., from a photo representing the user's face), or a user's geographic location may be generalized where location information is obtained (such as to a city, ZIP code, or state level), so that a particular location of a user cannot be determined. Thus, the user may have control over how information is collected about the user and used by any of the embodiments herein discussed.

What is claimed is:

1. A method comprising:
    displaying, by way of a user interface of a computing device, a visual prompt for input of identity data;
    receiving, by the computing device, a first audio waveform captured during an initial time window and representing a first plurality of utterances by a first speaker and a second plurality of utterances by a second speaker;
    receiving, by the computing device, the identity data of a first type indicating that (i) a first utterance of the first plurality of utterances corresponds to the first speaker and (ii) a second utterance of the second plurality of utterances corresponds to the second speaker;
    determining, by the computing device and based on the first utterance, the second utterance, and the identity data of the first type, a diarization model configured to distinguish between utterances by the first speaker and utterances by the second speaker;
    determining an accuracy of the diarization model in distinguishing between the first plurality of utterances and the second plurality of utterances;
    determining that the accuracy exceeds a threshold accuracy;
    based on determining that the accuracy exceeds the threshold accuracy, modifying the user interface to remove therefrom the visual prompt;
    receiving, by the computing device and exclusively of receiving further identity data of the first type indicating a source speaker of a third utterance, a second audio waveform captured during a subsequent time window and representing the third utterance; and determining, by the computing device, by way of the diarization model, and independently of the further identity data of the first type, the source speaker of the third utterance, wherein the source speaker is determined to be the first speaker or the second speaker.

2. The method of claim 1, further comprising:
updating, by the computing device, the diarization model based on the third utterance and the determined source speaker.

3. The method of claim 1, wherein the second audio waveform is received without displaying the visual prompt for the further identity data.

4. The method of claim 1, wherein the visual prompt comprises instructions indicating that (i) the first speaker is to speak for at least a first time period during the initial time window and (ii) the second speaker is to speak for at least a second time period during the initial time window, wherein the first time period and the second time period are mutually exclusive, and wherein receiving the identity data comprises:
capturing a first portion of the first audio waveform that represents the first utterance during the first time period; and
capturing a second portion of the first audio waveform that represents the second utterance during the second time period.

5. The method of claim 1, wherein receiving the identity data comprises:
receiving, by way of the user interface of the computing device, selection of a first button corresponding to the first speaker, wherein a first portion of the first audio waveform that represents the first utterance is captured in response to the selection of the first button; and
receiving, by way of the user interface, selection of a second button corresponding to the second speaker, wherein a second portion of the first audio waveform that represents the second utterance is captured in response to the selection of the second button.

6. The method of claim 1, wherein receiving the identity data comprises:
receiving, from a camera device, first image frames representing the first speaker speaking the first utterance, wherein a first portion of the first audio waveform that represents the first utterance is associated with the first speaker based on the first image frames representing the first speaker speaking the first utterance; and
receiving, from the camera device, second image frames representing the second speaker speaking the second utterance, wherein a second portion of the first audio waveform that represents the second utterance is associated with the second speaker based on the second image frames representing the second speaker speaking the second utterance.

7. The method of claim 1, wherein the diarization model comprises:
a waveform embedding model configured to (i) receive a portion of a waveform as input and (ii) generate an embedding vector comprising a plurality of values that are representative of characteristics of the portion of the waveform; and
a vector classification model comprising one or more of:
(i) a nearest centroid model based on the embedding vector, (ii) a k-nearest neighbor model based on the embedding vector, or (iii) a Gaussian Naive Bayes model based on the embedding vector.

8. The method of claim 7, wherein the vector classification model comprises the nearest centroid model, and wherein determining the diarization model comprises:
generating, by way of the waveform embedding model, a first plurality of embedding vectors that correspond to respective first portions of the first audio waveform that represent the first utterance;
generating, by way of the waveform embedding model, a second plurality of embedding vectors that correspond to respective second portions of the first audio waveform that represent the second utterance; and
determining (i) a first centroid based on the first plurality of embedding vectors and (ii) a second centroid based on the second plurality of embedding vectors.

9. The method of claim 8, wherein determining the source speaker of the third utterance comprises:
generating, by way of the waveform embedding model, a third embedding vector that corresponds to a third portion of the second audio waveform that represent the third utterance;
determining (i) a first distance between the third embedding vector and the first centroid and (ii) a second distance between the third embedding vector and the second centroid;
determining that the first distance is smaller than the second distance; and
based on determining that the first distance is smaller than the second distance, determining that the first speaker is the source speaker of the third utterance.

10. The method of claim 7, wherein the vector classification model comprises the Gaussian Naïve Bayes model, and wherein determining the diarization model comprises:
generating, by way of the waveform embedding model, a first plurality of embedding vectors that correspond to respective first portions of the first audio waveform that represent the first utterance;
generating, by way of the waveform embedding model, a second plurality of embedding vectors that correspond to respective second portions of the first audio waveform that represent the second utterance; and
determining (i) a first mean and a first standard deviation based on the first plurality of embedding vectors and (ii) a second mean and a second standard deviation based on the second plurality of embedding vectors.

11. The method of claim 10, wherein determining the source speaker of the third utterance comprises:
generating, by way of the waveform embedding model, a third embedding vector that corresponds to a third portion of the second audio waveform that represent the third utterance;
determining (i) a first probability that the third embedding vector belongs to the first plurality of embedding vectors based on the first mean and the first standard deviation and (ii) a second probability that the third embedding vector belongs to the second plurality of embedding vectors based on the second mean and the second standard deviation;
determining that the first probability is higher than the second probability; and
based on determining that the first probability is higher than the second probability, determining that the first speaker is the source speaker of the third utterance.

12. The method of claim 7, wherein determining diarization model comprises (i) generating, by way of the waveform embedding model, a first plurality of embedding vectors that correspond to respective first portions of the first audio waveform that represent the first utterance and (ii) generating, by way of the waveform embedding model, a second plurality of embedding vectors that correspond to respective second portions of the first audio waveform that represent the second utterance, wherein the vector classification model comprises the k-nearest neighbor model, and wherein determining the source speaker of the third utterance comprises:

generating, by way of the waveform embedding model, a third embedding vector that corresponds to a third portion of the second audio waveform that represent the third utterance;

determining k points nearest to the third embedding vector;

determining, for each respective point of the k points, whether the respective point belongs to the first plurality of embedding vectors or to the second plurality of embedding vectors; and determining the source speaker based on each respective point belonging to the first plurality of embedding vectors or the second plurality of embedding vectors.

13. The method of claim 7, further comprising:
updating the diarization model based on the third utterance and the determined source speaker by:
    determining a third plurality of embeddings of the third utterance; and
    updating the vector classification model to include therein at least a portion of the third plurality of embeddings.

14. The method of claim 2, wherein updating the diarization model comprises:
    determining a confidence of the diarization model in determining the source speaker of the third utterance;
    determining that the confidence exceeds a threshold confidence; and
    updating the diarization model based on determining that the confidence exceeds the threshold confidence.

15. The method of claim 2, wherein each utterance that forms the diarization model is assigned a corresponding weight within the diarization model, and wherein updating the diarization model comprises:
    assigning to the third utterance a third weight that is lower than at least one of (i) a first weight assigned to the first utterance or (ii) a second weight assigned to the second utterance.

16. The method of claim 1, further comprising:
receiving identity data of a second type indicating that (i) the first utterance corresponds to a first speaker and (ii) the second utterance corresponds to a second speaker;
receiving further identity data of the second type indicating the source speaker of the third utterance; and
verifying, based on the further identity data of the second type, the determination of the source speaker by way of the diarization model.

17. The method of claim 16, wherein the identity data of the first type represents input provided by way of a user interface of the computing device, and wherein the identity data of the second type comprises image data captured by way of a camera connected to the computing device.

18. A system comprising:
a microphone; and
a processor configured to perform operations comprising:
    displaying, by way of a user interface, a visual prompt for input of identity data;
    receiving, from the microphone, a first audio waveform captured during an initial time window and representing a first plurality of utterances by a first speaker and a second plurality of utterances by a second speaker;
    receiving the identity data of a first type indicating that (i) a first utterance of the first plurality of utterances corresponds to the first speaker and (ii) a second utterance of the second plurality of utterances corresponds to the second speaker;
    determining, based on the first utterance, the second utterance, and the identity data of the first type, a diarization model configured to distinguish between utterances by the first speaker and utterances by the second speaker;
    determining an accuracy of the diarization model in distinguishing between the first plurality of utterances and the second plurality of utterances;
    determining that the accuracy exceeds a threshold accuracy;
    based on determining that the accuracy exceeds the threshold accuracy, modifying the user interface to remove therefrom the visual prompt
    receiving, from the microphone and exclusively of receiving further identity data of the first type indicating a source speaker of a third utterance, a second audio waveform captured during a subsequent time window and representing the third utterance; and
    determining, by way of the diarization model and independently of the further identity data of the first type, the source speaker of the third utterance, wherein the source speaker is determined to be the first speaker or the second speaker.

19. The system of claim 18, wherein the operations further comprise:
updating the diarization model based on the third utterance and the determined source speaker.

20. A non-transitory computer-readable storage medium having stored thereon instructions that, when executed by a computing device, cause the computing device to perform operations comprising:
    displaying, by way of a user interface of the computing device, a visual prompt for input of identity data;
    receiving a first audio waveform captured during an initial time window and representing a first plurality of utterances by a first speaker and a second plurality of utterances by a second speaker;
    receiving the identity data of a first type indicating that (i) a first utterance of the first plurality of utterances corresponds to the first speaker and (ii) a second utterance of the second plurality of utterances corresponds to the second speaker;
    determining, based on the first utterance, the second utterance, and the identity data of the first type, a diarization model configured to distinguish between utterances by the first speaker and utterances by the second speaker;
    determining an accuracy of the diarization model in distinguishing between the first plurality of utterances and the second plurality of utterances;
    determining that the accuracy exceeds a threshold accuracy;
    based on determining that the accuracy exceeds the threshold accuracy, modifying the user interface to remove therefrom the visual prompt;
    receiving a second audio waveform captured during a subsequent time window and representing a third utterance, wherein the second audio waveform is received exclusively of receiving further identity data of the first type indicating a source speaker of a third utterance; and determining, by way of the diarization model and independently of the further identity data of the first type, the source speaker of the third utterance, wherein the source speaker is determined to be the first speaker or the second speaker.

\* \* \* \* \*